US007908645B2

(12) United States Patent
Varghese et al.

(10) Patent No.: US 7,908,645 B2
(45) Date of Patent: Mar. 15, 2011

(54) SYSTEM AND METHOD FOR FRAUD MONITORING, DETECTION, AND TIERED USER AUTHENTICATION

(75) Inventors: Thomas Emmanual Varghese, San Mateo, CA (US); Jon Bryan Fisher, Tiburon, CA (US); Steven Lucas Harris, Foster City, CA (US); Don Bosco Durai, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 768 days.

(21) Appl. No.: 11/412,997

(22) Filed: Apr. 28, 2006

(65) Prior Publication Data
US 2006/0282660 A1 Dec. 14, 2006

Related U.S. Application Data

(60) Provisional application No. 60/676,141, filed on Apr. 29, 2005.

(51) Int. Cl.
*G06F 7/04* (2006.01)
(52) U.S. Cl. ............. 726/4; 715/773; 715/830; 715/833
(58) Field of Classification Search ........................ None
See application file for complete search history.

(56) References Cited

U.S. PATENT DOCUMENTS

| D95,205 S | 4/1935 | Harrison |
| D298,837 S | 12/1988 | Thomas |
| 5,416,895 A | 5/1995 | Anderson et al. |
| 5,428,349 A | 6/1995 | Baker |
| 5,452,413 A | 9/1995 | Blades |
| 5,555,365 A | 9/1996 | Selby et al. |
| 5,559,961 A | 9/1996 | Blonder |
| 5,572,644 A | 11/1996 | Liaw et al. |
| 5,577,125 A | 11/1996 | Salahshour et al. |
| 5,604,854 A | 2/1997 | Glassey |
| 5,623,591 A | 4/1997 | Cseri |

(Continued)

FOREIGN PATENT DOCUMENTS
GB        2313460 A    11/1997
(Continued)

OTHER PUBLICATIONS

International Search Report of Apr. 7, 2006 for PCT application No. PCT/US2005/024376.

(Continued)

*Primary Examiner* — David J Pearson
(74) *Attorney, Agent, or Firm* — Kilpatrick Townsend & Stockton LLP

(57) ABSTRACT

The present invention provides systems and methods for authenticating access requests from user devices by presenting one of a plurality of graphical user interfaces selected depending on a perceived risk of fraud associated with the devices. User devices are identified with fingerprinting information, and their associated risks of fraud are determined from past experience with the device or with similar devices and from third party information. In preferred embodiments, different graphical user interfaces are presented based on both fraud risk and, in the case of a known user, usability. In preferred embodiments, this invention is implemented as a number of communicating modules that identify user devices, assess their risk of fraud, present selected user interfaces, and maintain databases of fraud experiences. This invention also includes systems providing these authentication services.

26 Claims, 21 Drawing Sheets

U.S. PATENT DOCUMENTS

| | | | |
|---|---|---|---|
| 5,664,099 | A | 9/1997 | Ozzie et al. |
| 5,798,760 | A | 8/1998 | Vayda et al. |
| D400,195 | S | 10/1998 | Utesch |
| 5,821,933 | A | 10/1998 | Keller et al. |
| 5,875,296 | A | 2/1999 | Shi et al. |
| 5,928,364 | A | 7/1999 | Yamamoto |
| 5,949,348 | A | 9/1999 | Kapp et al. |
| 5,966,127 | A | 10/1999 | Yajima |
| D419,907 | S | 2/2000 | Vogelbruch |
| 6,023,506 | A | 2/2000 | Ote et al. |
| 6,064,972 | A * | 5/2000 | Jankowitz et al. ............. 705/7 |
| 6,111,984 | A | 8/2000 | Fukasawa |
| 6,209,102 | B1 | 3/2001 | Hoover |
| 6,209,104 | B1 | 3/2001 | Jalili |
| 6,240,183 | B1 | 5/2001 | Marchant |
| 6,253,326 | B1 | 6/2001 | Lincke et al. |
| 6,263,447 | B1 | 7/2001 | French et al. |
| 6,282,551 | B1 | 8/2001 | Anderson et al. |
| 6,343,361 | B1 | 1/2002 | Nendell et al. |
| 6,369,839 | B1 | 4/2002 | Peterson |
| 6,448,987 | B1 | 9/2002 | Easty et al. |
| 6,658,574 | B1 | 12/2003 | Anvekar |
| 6,718,471 | B1 | 4/2004 | Kashima |
| 6,725,422 | B1 | 4/2004 | Bauchot et al. |
| 6,741,268 | B1 | 5/2004 | Hayakawa |
| D492,691 | S | 7/2004 | Kortis |
| D493,471 | S | 7/2004 | McIntosh |
| 6,853,973 | B2 | 2/2005 | Mathews et al. |
| D505,135 | S | 5/2005 | Sapp et al. |
| 6,895,502 | B1 | 5/2005 | Fraser |
| 6,934,860 | B1 | 8/2005 | Goldstein |
| 6,972,363 | B2 | 12/2005 | Georges et al. |
| 7,036,091 | B1 | 4/2006 | Nguyen |
| 7,082,227 | B1 | 7/2006 | Baum et al. |
| 7,100,049 | B2 | 8/2006 | Gasparini et al. |
| 7,137,008 | B1 * | 11/2006 | Hamid et al. ............. 713/182 |
| D539,809 | S | 4/2007 | Totten et al. |
| 7,200,747 | B2 | 4/2007 | Riedel et al. |
| 7,219,368 | B2 * | 5/2007 | Juels et al. ............. 726/2 |
| 7,240,367 | B2 | 7/2007 | Park |
| 7,437,024 | B2 | 10/2008 | Baum et al. |
| 7,523,067 | B1 * | 4/2009 | Nakajima ............. 705/39 |
| 7,596,701 | B2 | 9/2009 | Varghese |
| 7,616,764 | B2 | 11/2009 | Varghese |
| 2001/0027529 | A1 | 10/2001 | Sasabe et al. |
| 2002/0013905 | A1 * | 1/2002 | Hamada ............. 713/185 |
| 2002/0029341 | A1 | 3/2002 | Juels et al. |
| 2002/0049614 | A1 | 4/2002 | Rice et al. |
| 2002/0087894 | A1 * | 7/2002 | Foley et al. ............. 713/202 |
| 2002/0122031 | A1 | 9/2002 | Maglio et al. |
| 2002/0188872 | A1 * | 12/2002 | Willeby ............. 713/202 |
| 2003/0005329 | A1 | 1/2003 | Ikonen |
| 2003/0097593 | A1 | 5/2003 | Sawa et al. |
| 2003/0182558 | A1 | 9/2003 | Lazzaro et al. |
| 2003/0210127 | A1 | 11/2003 | Anderson |
| 2004/0010721 | A1 | 1/2004 | Kirovski et al. |
| 2004/0030933 | A1 | 2/2004 | Park |
| 2004/0030934 | A1 | 2/2004 | Mizoguchi et al. |
| 2004/0034801 | A1 | 2/2004 | Jaeger |
| 2004/0059951 | A1 | 3/2004 | Pinkas et al. |
| 2004/0083389 | A1 * | 4/2004 | Yoshida ............. 713/201 |
| 2004/0117320 | A1 | 6/2004 | Morioka et al. |
| 2004/0128534 | A1 * | 7/2004 | Walker ............. 713/200 |
| 2004/0153660 | A1 * | 8/2004 | Gaither et al. ............. 713/200 |
| 2004/0168083 | A1 | 8/2004 | Gasparini et al. |
| 2004/0215980 | A1 | 10/2004 | Hamid |
| 2004/0221163 | A1 * | 11/2004 | Jorgensen et al. ............. 713/182 |
| 2004/0230843 | A1 | 11/2004 | Jansen |
| 2004/0250138 | A1 | 12/2004 | Schneider |
| 2005/0010768 | A1 | 1/2005 | Light et al. |
| 2005/0015601 | A1 | 1/2005 | Tabi |
| 2005/0044425 | A1 * | 2/2005 | Hypponen ............. 713/202 |
| 2005/0097320 | A1 * | 5/2005 | Golan et al. ............. 713/166 |
| 2005/0144451 | A1 | 6/2005 | Voice et al. |
| 2005/0193208 | A1 | 9/2005 | Charrette et al. |
| 2005/0204131 | A1 * | 9/2005 | Kovarik, Jr. ............. 713/166 |
| 2005/0204145 | A1 | 9/2005 | Makishima |
| 2005/0251752 | A1 * | 11/2005 | Tan et al. ............. 715/741 |
| 2005/0278542 | A1 * | 12/2005 | Pierson et al. ............. 713/182 |
| 2005/0278647 | A1 | 12/2005 | Leavitt et al. |
| 2006/0011045 | A1 * | 1/2006 | Yamashita et al. ............. 84/611 |
| 2006/0020815 | A1 | 1/2006 | Varghese et al. |
| 2006/0104446 | A1 | 5/2006 | Varghese et al. |
| 2006/0212829 | A1 | 9/2006 | Yahiro et al. |
| 2007/0097351 | A1 | 5/2007 | York et al. |
| 2007/0165849 | A1 | 7/2007 | Varghese et al. |
| 2007/0192615 | A1 | 8/2007 | Varghese et al. |
| 2009/0089869 | A1 | 4/2009 | Varghese |

FOREIGN PATENT DOCUMENTS

| | | | |
|---|---|---|---|
| JP | 2004258845 A * | 9/2004 | |
| WO | WO 96/18139 A1 | 6/1996 | |
| WO | WO 2004/053674 A2 | 6/2004 | |
| WO | WO 2006/010058 A2 | 1/2006 | |
| WO | WO 2006/118968 A2 | 11/2006 | |
| WO | WO 2007/087352 A2 | 8/2007 | |

OTHER PUBLICATIONS

International Preliminary Report on Patentability of Apr. 13, 2007 for PCT application No. PCT/US2005/024376.

Written Opinion of Apr. 7, 2006 for PCT application No. PCT/US2005/024376.

International Search Report of Jul. 7, 2008 in corresponding international application PCT/US06/16085.

Written Opinion of Jul. 7, 2008 in corresponding international application PCT/US06/16085.

International Search Report of Feb. 14, 2008 in PCT application No. PCT/US07/01899.

Written Opinion of Feb. 14, 2008 in PCT application No. PCT/US07/01899.

International Preliminary Report on Patentability of Jan. 2, 2009 in PCT application No. PCT/US07/01899; pp. 10.

US Non-Final Office Action for U.S. Appl. No. 11/340,376, dated Jan. 15, 2009; pp. 9.

US Non-Final Office Action for U.S. Appl. No. 11/318,414, dated Jan. 27, 2009; pp. 8.

International Preliminary Report on Patentability of Aug. 28, 2008 in International Application No. PCT/US2006/016085.

Non-Final Office Action for U.S. Appl. No. 11/340,376 mailed on Aug. 4, 2008; pp. 5.

Advisory Office Action for U.S. Appl. No. 11/340,376 mailed on May 27, 2008; pp. 3.

Notice of Allowance for U.S. Appl. No. 11/340,376 mailed on Jun. 12, 2009; pp. 12.

Notice of Allowance for U.S. Appl. No. 11/169,564 mailed on Jun. 1, 2009; pp. 9.

Final Office Action for U.S. Appl. No. 11/318,424 mailed on Jun. 2, 2009; pp. 16.

Non-Final Office Action for U.S. Appl. No. 11/318,424 mailed on Sep. 1, 2009; 14 pages.

Final Office Action for U.S. Appl. No. 11/318,424 mailed on Mar. 10, 2010; 11 pages.

Advisory Action for U.S. Appl. No. 11/318,424 mailed on May 25, 2010, 3 pages.

Notice of Allowance for U.S. Appl. No. 11/318,424 mailed on Jun. 16, 2010; 7 pages.

* cited by examiner

SYSTEM AND METHOD FOR FRAUD MONITORING, DETECTION, AND TIERED USER AUTHENTICATION

CROSS REFERENCE TO RELATED APPLICATION

This application claims the benefit of U.S. provisional application Ser. No. 60/676,141 filed Apr. 29, 2005 and which is incorporated herein by reference in its entirety for all purposes.

FIELD OF INVENTION

The invention relates generally to systems and methods for providing protection against identity theft over a computer network.

BACKGROUND OF INVENTION

The growth in the volume of online transactions conducted by businesses and individuals over the Internet has been staggering. Sensitive private identity information is typically used for authenticating a user for conducting online transactions. The increased use of identity information for Internet transactions has been accompanied by an increased danger of interception and theft of that information. Identity theft occurs when someone uses the password, username, Social Security number, credit card number, or other identifying personal information of another without consent to commit fraud. According to a September 2003 Federal Trade Commission (FTC) survey, 27.3 million Americans have been victims of identity theft in the last five years, including 9.9 million people in the year 2002 alone. Identity theft losses to businesses and financial institutions in 2002 totaled nearly $48 billion and consumer victims reported $5 billion in out-of-pocket expenses, according to the FTC survey.

To enter into a transaction with an E-commerce server, a user typically needs to provide sensitive and confidential data including authentication data, data describing the transaction, and the like. This data is commonly entered by using a keyboard and/or a mouse connected to a device local to the user that is running a web browser that is linked to the Internet (or other computer network). FIG. 1 is a diagram illustrating an exemplary system 10 used for entering user authentication and transaction data. In this example, the authentication information to be entered by a user comprises a user ID and password. In known systems, the user ID and password are composed of a string of characters entered via a keyboard 12 while executing a web browser on a computing device 14. A typical user entry interface 18 provided by the browser to the user on a display 16 is shown.

After entry, a user's sensitive information is typically transmitted to a remote server preferably in an encrypted form over secure connections. For example, the widely-used TCP/IP communication protocol includes security protocols built on the secure socket layer (SSL) protocol to allow secure data transfer using encrypted data streams. SSL offers encryption, source authentication, and data integrity as a means for protecting information exchanged over insecure, public networks. Accordingly, many E-commerce servers and applications use SSL, or similar security protocols, to exchange data between remote servers and local user systems. If the entered authentication information is approved by the server, the user is permitted to send and receive data from the server's website.

The source of messages received at a web server is often determined from the IP address of the device from which the message is sent and/or from a cookie included with data from the user. A cookie generally refers to a packet of information, often sensitive information, sent by a web server to a browser resident on the user's computer system for saving to a file and for transmitting back to the server whenever the user's browser makes additional requests from the server. The IP address is generally included in a message header, and the cookie is usually one that has been previously sent by the server, often at login. The server compares the user login data with the message IP address and the returned cookie to determine the identity of the user sending the message and whether the user is currently logged into the server. The IP address of the user is also confirmed.

Despite these known precautions, a user's sensitive information remains vulnerable because it is in a raw unsecured form between its entry by the user and its encryption prior to remote transmission. Also, sensitive data sent from the server is vulnerable during the period after its decryption and until its display. This unsecured information can be surreptitiously captured in a number of ways. For example, cookie hijackers copy sensitive information from cookies. Further, keyboard loggers and mouse click loggers are hidden software that intercept and copy mouse clicks and depressed keys after user entry but before processing by a browser or other software. Logger software can readily intercept the user's secure information. Keyboard loggers and mouse click loggers might also take the form of hardware connected between the keyboard and mouse cable and the computer or the hardware inside the keyboard and mouse device.

Even graphical user interfaces that represent on-screen keypads and keyboards with selectable graphics for user entry (instead or in addition to providing fields for text entry) are vulnerable to mouse click loggers, screen capture loggers, and other schemes. FIGS. 1, 2, and 3 illustrates prior art examples of such interfaces. Each alphanumeric character in the graphical interface is represented by a unique graphical image, e.g., the pixels forming the number "1". Screen capture loggers utilize optical character recognition (OCR) technology to decipher characters selected by mouse clicks and the corresponding alphanumeric graphics in order to ascertain the actual alphanumeric text characters of a user's ID and password. Sophisticated screen capture loggers might also utilize checksum and size characteristics of the graphic images in order to ascertain which the data item corresponding to a graphic image selected by a user's mouse click during data entry. In these ways, the screen capture loggers may acquire the personal information even when the graphical user interface has rearranged the order of alphanumeric characters on the keypad or keyboard.

Sensitive information can also be intercepted by espionage software, including snoopware, spyware, non-viral malware, hackers utilities, surveillance utilities, Trojan horses, etc. Espionage software aids in the unauthorized acquisition of information about a person or organization without their knowledge or consent. It typically installs itself on a user's computer without consent and then monitors or controls the use of the device. Every user keystroke, all chat conversations, all websites visited, every user interaction with a browser, every application executed, every document printed, all text and images, might be captured by the espionage software. Espionage software typically is capable of locally saving or transmitting the captured data to third parties over the Internet, most often without the user's knowledge or consent.

Another fraudulent acquirer of sensitive personal information is an "over-the shoulder" spy who surreptitiously reads a user's display to acquire the information.

Known anti-virus and anti-spyware software products attempt to enable a user to protect against such malicious software. However, use of outdated anti-virus and anti-spyware files provides minimal protection, at best, of computer data against outside threats. Consequently, a drawback of these products is that the information used by the anti-virus and anti-spyware program must be constantly updated to reflect newly discovered schemes in order to keep the protection current. In addition to keeping the virus information current, the system must be periodically scanned for potential infections.

Further, certain geographic locations are known to contain an inordinate number of identity thieves. It is therefore advantageous to know where an attempt to access a server originates from. IP addresses are one readily available source of location information. But IP addresses have drawbacks in that, for many users, the IP address is not constant. Known network protocols and facilities can lead to variable IP addresses. For example, proxy servers are used to provide a gateway between a local area network of an organization and the Internet. The local network is protected by firewall software installed on the proxy server. Proxy servers dynamically assign new IP addresses to a user device each time a new message is sent therefrom. As a result, there is no constant IP address assigned to an individual user device for users connected to the Internet via a proxy server.

Another source of IP address variability is the commonly used dynamic host configuration protocol (DHCP protocol) which assigns IP addresses dynamically and automatically to the devices on a TCP/IP network. A DHCP server assigns an IP address to a device from a list of available addresses when the device connects to the network. The device retains this IP address only for the duration of the current session. Some DHCP server systems can dynamically change the user's IP address during the session. The use of a proxy or DHCP server means that the IP address alone may not be enough to identity a particular user device.

Security systems and methods that protect against the above-identified risks should also meet the usability concerns of an average user. A service provider wants to encourage online use in a secure manner. But a cumbersome and prolonged user interface or a less user friendly interface might discourage or even intimidate and frustrate users, or cause user errors, or the like. Also a security system should institute precautions to prevent execution of a fraudulent transaction once it has been found that the user's information and/or system is at risk of being compromised. A security system should also alert the service provider based on a particular device attempting to access the provider's system irrespective of the user.

Also, a security system and method should enable a service provider to strike a proper balance between security and usability of the system. In other words, a system and method is needed to enable a service provider to provide an easy to use and lower security interface when no security risk is identified, and a higher security interface when one is identified. Additionally, desirable security systems and methods should depend as little as possible upon human action to maintain their state of security. For example, it not advantageous to require users to keep and maintain tokens or digital certificates or the like. A token can be lost, damaged, stolen and the like.

But security systems protecting against the described threats and having the described properties are not generally known in the art. What is needed but currently lacking in the art is a security system and method with the following features and aspects:

is a device-based fraud monitoring system;

provides robust fraud monitoring and detection along with robust fraud analysis and risk assessment so that online service providers have real time information needed to determine how and whether to allow a device to access the provider's system;

provides selectable levels of secure user authentication as a function of usability and/or security concerns;

ascertains the security risk that a user's information and/or system have been compromised and if so, provides a more secure login interface to guard against fraudulent activity;

a repository of information for identifying legitimate and fraudulent users based on more reliable and robust fingerprinting of the user device that can be integrated with other repositories of security tracking information;

is a purely software based solution to identity theft that does not require hardware devices to be issued and maintained;

is convenient for online users.

SUMMARY OF THE INVENTION

The systems and methods of the present invention fill gaps in the prior art by providing improved authentication services.

An advantage of the systems and methods according to the present invention is that they provide information and selectable user interfaces for enabling a service provider to take action to authorize, deny, or put on hold online transactions in real time as a function of the risk presented by both the user and the device attempting to conduct a transaction.

Another advantage of the present invention is that it enables a service provider to identify possible in-process fraudulent authentication transactions, based on both user and device historical data analysis. Transactions can be approved, declined, or put on hold for verification based an a set of predetermined rules.

Another advantage of the present invention is that it provides both user and device based robust fraud monitoring and detection along with robust fraud analysis and risk assessment to give a service provider real time information needed to determine how and whether to allow a device to access the provider's system.

Another advantage of the present invention is the enabling of a selection of levels of secure user graphical authentication as a function of predetermined usability and/or security concerns.

Another advantage of the present invention is that there is no dependence on tokens, cards and other similar hardware devices, digital certificates, anti-virus software, or personal firewall solutions for protecting end users against online identity theft.

Another advantage of the present invention is the acquisition and development of a blacklist and/or white list that is device based rather than only user based.

Broadly stated, according to an embodiment, the present invention fingerprints a user's device by obtaining device identifying information that can be used to assess the fraud risk posed by a user at that user device. According to another embodiment, the present invention performs fraud analysis and alerting of the risk associated with the device being used to access a service provider's server. According to another embodiment, this invention includes a database of user devices and their historical known fraud risks available in a central repository. According to another embodiment, this invention presents user authentication interfaces selected from a plurality of user authentication interfaces that provide a plurality of levels of security and usability.

Accordingly, the present invention provides systems and methods for providing levels of fraud monitoring, detection, and a tiered user authentication comprising a fingerprinting module for identifying a user device that has requested connection to a server; an authenticator module for enabling selection from of a plurality of login graphical user interfaces as a function of predetermined selection criteria for presentation on the user device, wherein the selection criteria is in the form of rules regarding usability and security; a fraud analyzer and alert module for analyzing and assessing the risk associated with the user device as a function of historical tracking of use of the user device; and a device central repository for identifying legitimate and fraudulent users based on the fingerprinting module and other repositories of tracking information. This invention provides variously architected systems that implement the methods of this invention to provide authentication services to one or more service providers.

An example of the present invention's usability and security features is provided by users who have forgotten their login id or password. Such a user typically accesses a system from a limited number of user devices, and the fact that authentication attempts of this type were made from such a device is recognized by the present invention and can be used to present a helpful interface to the user. If the device is unknown to the system, this can signal that a hacker is trying to break into the system and can be used to present an authentication interface of heightened security. Additionally, such users typically enter his user/password information that is almost but not entirely accurate. This can be recognized by the present invention and used to further guide user authentication. In preferred embodiments, these options are represented by rules processed by a rules engine.

A further example of this invention's usability and security features is provided by the ability to distinguish user behaviors. If an access originates from a user device that has not previously accessed a service provider (e.g., as detected by the absence of a device token stored on the user device), system rules can required that this access pass a higher level of authentication or challenge. However, the user may be a savvy user who routinely removes application tokens from their user device (almost 15% of Internet users). Further, on the basis of previous accesses, this user may be associated with a behavior pattern indicating routine access from not-readily-identifiable devices. Then, this user is preferably not challenged or subject to a higher level of scrutiny. In contrast, systems with authentication systems that do not adjust the authentication process on the basis past user behavior would always challenge such a user. Accordingly, the present invention provides a better user experience for all the users, whether they are savvy or not.

In further detail, the systems and methods of the present invention verify each user's computer and location ("something you have") along with behavioral usage patterns on a site to confirm identity ("something you are"). These verifications are added on top of existing enterprise requirements for login/password credentials ("something you know"). This offers the enterprise several strong additional layers of anti-fraud protection.

The present invention includes secure cookies, flash objects and other technologies to recognize and to fingerprint the from which device a user access an application, whether it is a computer, laptop, mobile device or any other. These user devices thus become additional authentication factors without requiring any change in user behavior. Information concerning these user devices is fingerprinted and stored into a device token or device id for one-time use. The id or token is stored on the user device and saved in a database for later comparison with tokens retrieved from subsequent user device accesses. The token is invalidated if a user attempts to reuse it.

The present invention also includes user device tokens or device ids that have a unique number which is randomly generated by the methods of this invention. Such device tokens are then assigned to the particular user device, stored on the particular user device as persistent data (e.g., a cookie), and also stored so as to be accessible to the authentication services of this invention. The particular user device can be thereby identified upon a subsequent access by retrieving the device token from the user device and comparing the unique number with the stored information. If the data matches, this particular device is identified. Then a new unique identifier number is created and is stored on the user device and by the methods of this invention for use in a further access.

The present invention enables application service providers score risk for each online login and transaction and to increase authentication security in real time, at login and in session, for transactions that may be high risk or potential fraud. It evaluates the pre, post and in-session characteristics of each transaction to ensure fraud detection and transactional integrity. The methods then provide a service provider with scores, actions, and alerts. For example, if a transaction has a high risk score and is thus potentially fraudulent, one preferred action is to hold the transaction and to then seek secondary authentication or secondary challenge. The user is, e.g., asked to call service provider personnel to confirm the validity of the held transaction. Another action is to reject the transaction. Different actions may be appropriate to different transaction types. In the case of banking service providers, viewing account balances is acceptable but wire transfers are not acceptable; or in the case of ecommerce/ASP service providers, download of sensitive documents may restricted based on the risk score. These actions are preferably invoked by rules evaluated during transaction evaluation.

The systems and methods of the present invention include the following features: device, location and user behavior ("workflow") fingerprinting; user profiling through capture and recording of user workflows; real-time risk scoring; real-time, rules-based fraud alerts and response; alerts; automatic internal flagging of suspicious activity; configurable, out-of-band end-user optional secondary authentication (via e-mail, SMS, voice print other); 3rd party integration via open APIs; support for shared authentication and fraud services infrastructure; case management tools for reviewing individual client logs; customer care tool for servicing inbound customer care; a dashboard for real time fraud and activity monitoring; reporting for risk management and trending analysis; and administration for system and rules configuration and maintenance. The methods and systems include the following components and features: rules engine; risk scoring/forensics; real-time response; proprietary fingerprinting of devices, locations, workflows; models and rules; intelligent algorithms; and comprehensive administrative tools such as a dashboard, reports, and customer care These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

Reference symbols or names are used in the Figures to indicate certain components, aspects or features shown therein, with reference symbols common to more than one Figure indicating like components, aspects or features shown therein.

DETAILED DESCRIPTION OF THE PREFERRED EMBODIMENTS

This invention generally provides systems and methods that interface with service providing systems of online service providers and assists them in authenticating their user requests, especially user log on requests and transaction sequences (referred to herein as a user's "workflow"). Briefly, this invention authenticates a user and a login request (referred to herein as "pre-authentication") in a manner determined both by the identity of the device from which the authentication request originates this invention as well as by available information concerning the identity of the requesting user. User workflow sequences are authenticated (referred to herein as "post-authentication") using a user's transaction history. In both applications, the precise authentication processes and decisions can be directed by rules from the service provider.

Preferred System Configurations

The general structure and arrangement of preferred embodiments of these systems and methods are now described, following are more detailed descriptions of preferred embodiments of the component processes. Heading are used herein solely to aid clarity and without any intended limitation.

Figure 13A:
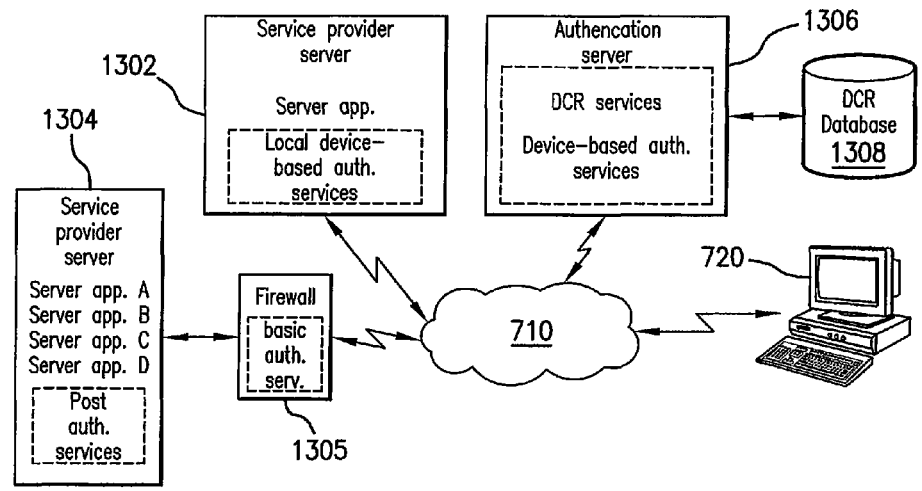
FIGS. 13A and 13C illustrate exemplary system implementations of the present invention.

FIG. 13A illustrates an exemplary embodiment of the present invention directed to providing authentication services to online service providers who make available to individual users online server applications. Generally, the server applications execute on service-provider server machines. The embodiment illustrated includes one or more service-provider computer systems, e.g., systems 1302 and 1304 and an authentication system server system 1306, interconnected through network 710 to one or more user devices 720 at which users enter logon and subsequent transaction requests. The systems server 1306 is generally structured as known in the art, and includes a CPU, RAM memory, disc or other database memory 1308, communication interfaces, optional user interface equipment, and the like. Databases 1308 for store data used in authentication processes, such as device and user histories. The network can also be generally structured as known in the art and can be a private intranet, the public Internet, or the like. The user device from which a user makes requests to server applications can be a workstation-type computer, a PC-type computer, a terminal, if the like.

In many preferred embodiments (but without limitation), the authentication processes of the invention are implemented with a client-server-type architecture (or, more generally, a distributed-systems-type architecture). Accordingly, the individual processes providing authentication services for a particular service provider application can both execute on the service provider's computer system or be distributed among other network-attached computer systems. Preferred distribution architectures include one or more authentication servers that at least host a device central repository ("DCR") service.

The DCR receives, stores, and makes available online information 1310 identifying user devices and the fraud risks associated with the user devices. This information can include blacklists and/or white-lists of devices with higher risk of fraud and with lower risk of fraud, respectively. This information can be gathered from the authentication experiences of the service providers participating in an implementation of this invention, or from other concurrent and intercommunicating implementations of this invention, from 3'rd party data sources, and the like. Authentication servers can also host service provider applications.

Optionally, the authentication server can also host the actual authentication processes of this invention, which are then configured as server processes responding to requests from application executing remotely on service provider computer systems. Thereby in certain embodiments of this invention, the authentication server system also provides "device-based authentication services" as well as "DCR services". A service provider server system, e.g., system 1304, for example, need itself not run all (or any) authentication processes, but instead can access those processes it does not host (or all authentication processes) on the authentication server. In other embodiments, a service provider system can execute all authentication processes, and therefore need only access the authentication server for optional DCR services. In FIG. 13A, system 1302 does not itself perform pre-authentication processing, but does performs "post-authentication services".

authentication protocols, such as a security question, before allowing access. This embodiment is applicable to an entity such as an organization, company or law firm for authenticating remote log-ins from its employees, members or other users, where these employees or users number approximately 10,000 or less.

Figure 13B:
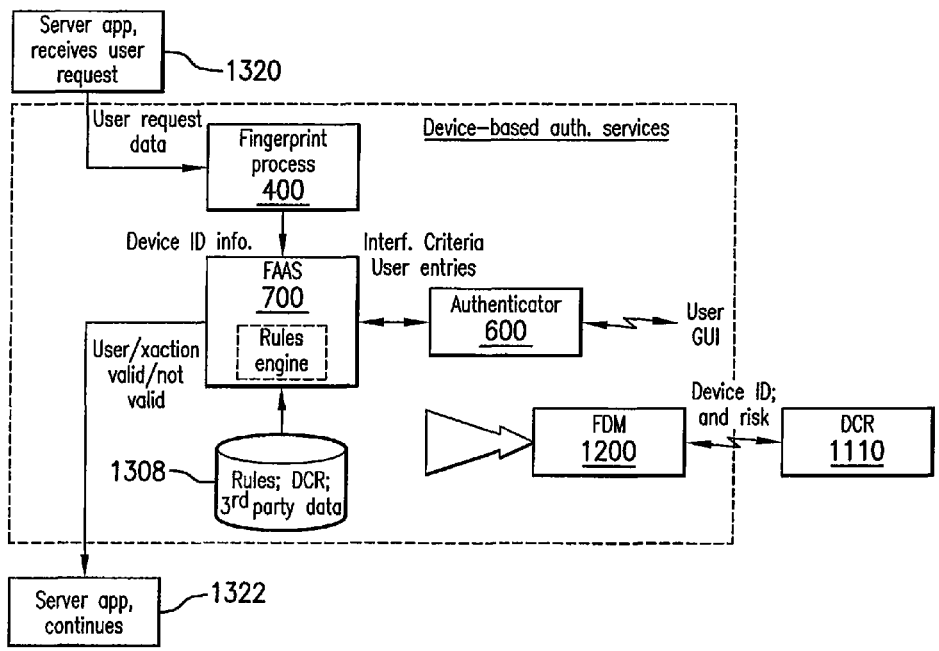
FIG. 13B illustrates an exemplary method structure implementation of the present invention.

FIG. 13B illustrates the computer-implemented processes that cooperate to provide the authentication services, primarily pre-authentication services, of this invention. In the illustrated preferred embodiment, these processes are structured as shown within the enclosing dotted lines and include: fingerprint processes 400, fraud analysis and alert service ("FAAS"), authenticator service 600, and flagged device module ("FDM"). Links between processes are labeled by important input and output data types.

Authentication services are invoked when a server application or services provider computer system receives user request 1320 that needs authentication. In the case of pre-authentication, the most common user request is a login request to access an application or system. Other requests usually handled by post-authentication services include, e.g., transaction requests involving large amounts of money. User requests can be received directly from communication subsystems, or alternatively, can be forwarded from the service provider application or system across an interface to the authentication processes.

In preferred embodiments, authentication services can be invoked through an externally available application programming interface ("API"). Table 1 list a selection of exemplary API requests.

TABLE 1

Example API requests

| # | Description | Action | Request XML | Response XML |
|---|---|---|---|---|
| 1 | Pre-authentication request to fingerprint the device | FingerPrintRequest | FingerPrintRequest.xml | FingerPrintResponse.xml |
| 2 | Updates the authentication status for the authentication session | UpdateAuthResult | UpdateAuthResultRequest.xml | FingerPrintResponse.xml |
| 3 | Processes the rules | ProcessRules | ProcessRulesRequest. | ProcessRulesRespon |

In another preferred embodiment, authentication services, usually pre-authentication services can be performed on a firewall machine (or other type of network gateway machine). In FIG. 13A, firewall 1305 performs primarily pre-authentication services for service-provider system 1304. If a user is authenticated, then that user can access service provider applications, e.g., applications A, B, C, D, and so forth. In certain instances, a firewall can perform all pre-authentication service processing; however, in most instances, it is advantageous for the firewall to act as a client to the authentication services of the authentication server. In fact, it may not be practical for a firewall to perform full pre-authentication processing even with server assistance, in which case it can perform a subset of authentication processing (referred to herein a "basic authentication services").

Basic authentication services can be limited to user device fingerprinting and confirmation of basic machine data, e.g., IP address, operating systems, device ID, and the like. As described subsequently, the user's computer is provided with a cookie that includes the identifying information of the machine. This cookie is reviewed by the firewall upon login to verify that it matches what the entity knows about the user. Discrepancies can be identified and scored to determine whether to allow access or not or whether to apply secondary The first request would typically be sent from a service provider application to begin an authentication of a device from which a user request has been received. The second request can be sent when the service provider application wishes to check authentication status for performing, e.g., a high-value transaction. Finally, the third exemplary request can provide rules and have them processed in view of the current authentication information characterizing a user or session.

Fingerprint process 400 is the first authentication process invoked with input data describing the user request. The fingerprint process then gathers identifying information describing the device from which the user request originated and creates a device identifier ("Device ID"). The Device ID (and optionally other device identifying information) is stored on the user device from which it can be retrieved and form part of the device identifying information to be used during a subsequent fingerprinting Next, FAAS process 600 is invoked with the Device ID (and optionally other device and/or user identifying information). This process evaluates its input identifying information and either can, e.g., recommend to the service-provider application or system that the request should be processed further or blocked from the system (referred to herein as "actions"). This process can also provide risk alerts and risk scores (referred to herein as "alerts" and "scores") describing the relative risks of the input request so that the service-provider application or system can themselves make such authentication decisions. FAAS evaluation preferably begins with retrieving forensic information related to the characteristics of the current request that are apparent in the input request information. Information sources can include system DCR services, which stores an authentication system's past authentication results, and third party data services, which can provide a wide range of data, e.g., geolocation data services providing likely geographical source of the current request. The input data and the retrieved forensic data is then analyzed by a rules-based decision process in order to determines output actions, alerts, and scores.

In other words, device id is usually available and then is the primary item to identify an authorized user. Even when the device id is recognized, the user can be required to provide additional security information before being allowed access. Other conventional security protocols (i.e., personal questions, selection of personal information from a multiple choice question, etc.) or even a higher level of security (i.e., telephone IP administrator, call to provide voice recognition, etc.) can be used. When a user knows in advance that a different computer will be used for access at certain times, e.g. business travel to a new location with use of a different computer contemplated, then this information can be provided to the entity and its IP administrator so that the rules for that particular user and time period can be changed to facilitate access to the system and its application.

If a request is to be further processed, a further exemplary action is the selection of preferred graphical (or other type) authentication interfaces ("GUI") for authenticating a newly arrived user or an existing user making a request that needs particular authentication. Authentication interface selection criteria can be determined in accordance with the evaluated risk scores and any risk alerts. The selection criteria will then call for an interface with a security that is commensurate the risk of fraud. Also, the risk information can also be provided to the service provider system or application which can then perform, e.g., more thorough checking of authentication data or requesting the authentication services of this invention to re-authenticate the user or request. This can involve, e.g., seeking responses to details authentication questions, or obtaining biometric identification information (e.g., fingerprints, retinal scans, or the like), or obtaining voice prints, or the like.

Next, authenticator process 700 is invoked with the interface selection criteria, selects an particular user authentication interface from a user-interface database according to the criteria, and then presents the selected interface at the originating user device, and receives the data entered in response to interface presentation. The entered data is then used as part of the authentication decision by the service provider application 1322 of processes of this invention. The server application, or the FAAS, or both together then decide whether on not to authenticate the current request.

The DCR process gathers the results of the current request-authentication processing and stores them in DCR database 1110 in association with the identifying information (for example, the Device ID) for the originating user device. These stored processing results preferably include, at least, whether or not the request was validated or not and/or whether or not the request was found to be fraudulent. Thereby, the DCR database can provide an historical record of the results of previous request-authentication processing to guide the FAAS in current authentication-request processing. The DCR database includes at least data obtained from the current service provider. Preferably, it also includes data from other service providers so that device risk information can be shared and the accuracy of authentication processing can be multiplied.

FDM 1200 performs the actual gathering and assembly of the results of the current request-authentication processing. Data from the current request can optionally be supplemented by the third party data similar to that data already retrieved by the FAAS and/or other data retrieved by the FAAS relevant to evaluating the current request. The FDM process can execute either locally or remotely as part of authentication services, or can be implemented as part of DCR services.

Figure 13C:
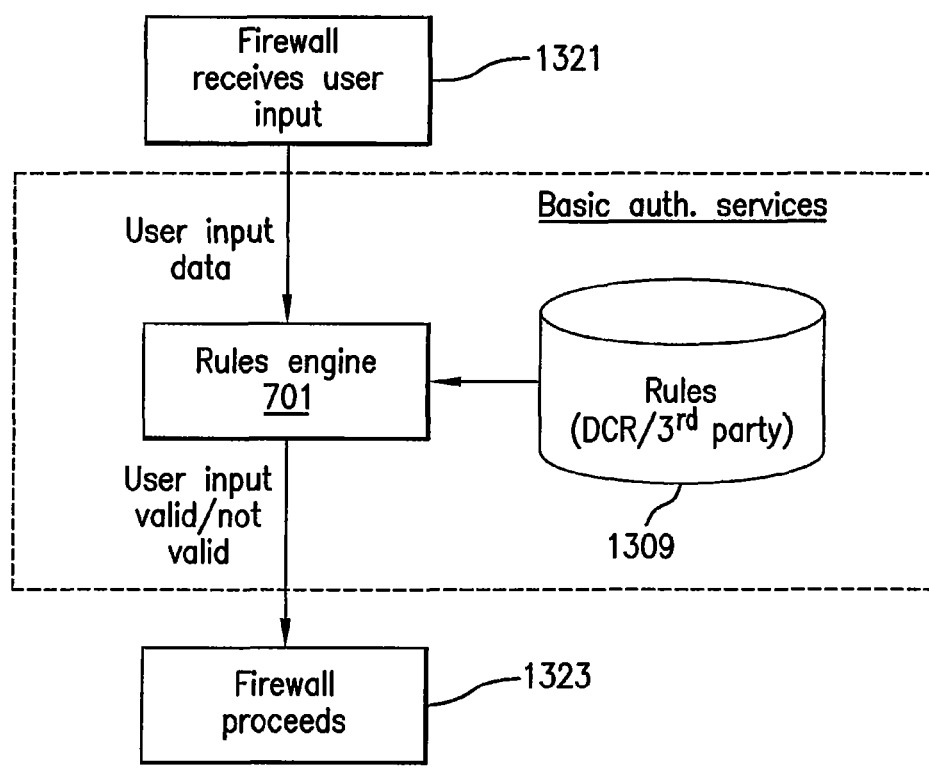

FIG. 13C illustrates computer-implemented processes for an exemplary embodiment of the basic authentication services that might be invoked (locally or remotely) by a firewall or router. This particular embodiment performs only the minimal processing necessary to authenticate according to this invention, rules engine process 701. This process is invoked when a user request is received by, e.g., a firewall, and receives information describing the request. In one alternative, this process determines actions and scores from input data descriptive of the user transaction and rules retrieved from database 1809 (either supplied by a service provider or default rules available from the authentication system). The rules can be either proactive or reactive. For example, access can be blocked unless the fraud risk is low, or allowed unless the fraud risk is high. In other alternatives, process 701 can also retrieve and rely on data from the DCR database and/or 3rd party sources. Actions, scores, and/or alerts are then provided for further processing by the firewall 1322.

In other words, when the system finds an elevated risk score, it evaluates rules in view of the risk score and can carry out actions, alerts, or risk score reporting. Table 2 provides preferred categories of responses to an elevated risk score.

TABLE 2

| Events & Risk Scoring Engine |
| --- |
| Determine and output weighted risk score |
| Customizable thresholds |
| Customizable actions |
| Customizable alerts |

An exemplary action is the setting of an Internal flag or adding to a watch list so that the service provider can follow up later. Another exemplary action is online or out of band secondary authentication, preferably based on a challenge response model. For example, online secondary authentication can require a user to response to an email sent to a registered email address. Out of band authentication can include various biometrics such as a voiceprint which can require a user to verbally a response to a challenge.

The methods of this invention retrieve information concerning a device from which a request originates, the user originating the request, and the transactions requested by that user. Efficient handling of this information is advantageous, especially in commercial applications servicing a large number of concurrent users. Thus in many preferred embodiments gathered information is stored for online use in a condensed or summary form, and for offline use in nearly full or full detail. Online uses include, e.g., real time authentication and authentication update. Offline uses include, e.g., data mining, rule refinement, and so forth.

A preferred condensed or summary form is referred to herein as a fingerprint. First, possible values of a category of data or of an authentication criteria are divided into a number of "bins". Then the category or criteria fingerprint of a particular user is a representation (e.g., as a binary token) of the gathered data which indicates only which bins have data and which do not. This representation can be optionally compressed using known techniques. Thereby, a user's authentication and transaction requests can be represented in several binary tokens.

For example, in a typical online business application, there may be 20 unique pre-identified sensitive transaction sequences (workflows). Each workflow can be characterized by, e.g., ten bins or variable with each variable having, e.g., ten bind of values. Therefore, a user can be characterized by a fixed number of possible fingerprints with each user having on average, e.g., ten unique fingerprints.

Preferred Functional Configurations

The function of the present invention are configured to provide consistent methods of checking the authenticity and security of a user-initiated request made to a service-provider application, e.g., a online store application, an online banking application, and the like. The methods receive a copy of the request itself or information describing and abstracting the substance of a current request. The input information is processed, and the methods output risk scores, risk alerts, and actions (or action recommendations). Risk scores and alerts are indicia of the likely risks that the current request is incorrect, or malicious, or fraudulent, and so forth. More specifically, the risk scores output are products of a number fraud detection inputs which are weighted and analyzed in real time using analytic processes customizable for individual service providers. Fraud detection inputs describe the user, the user's device, the location of the user's device, the workflow of transaction entered by the user, historical patterns of user accesses, and data from 3rd party data sources. This information is provided to service-provider applications and systems ("users" of the invention) for use in their internal authentication processes. The methods of this invention can also recommend or initiate actions according to service-provider guidelines or rules. These actions are generally directed to gathering information for authenticating the request being processed.

Generally, the available, security-relevant information related to a user request (the "request attributes") is broken into related information groupings referred to as criteria so that each criteria preferably contains several pieces of data concerning a user request. Groups of rules, preferably criteria-specific, then evaluate the criteria, and the risk scores and actions that are output result from a combination and weighting of the results of the rule-based evaluation of each criteria. As a user request, and especially as a related group of user transactions, is authenticated by this invention and processed by service-provider applications, more or less criteria data are available and criteria have varying importance. For example, before a user is authenticated and granted access to a service-provider application, data relevant to workflow criteria (e.g., a sequence of related transactions by a user) is usually not available. On the other hand, when a user is engaged in requesting transactions, criteria related to initial authentication are usually less important. These periods are referred to as the "pre-authentication" period and the "post-authentication" period respectively.

Preferred pre-authentication criteria include location information and device information, and preferred post-authentication criteria include user information and workflow information. Table 2 present exemplary data relevant to each of these criteria.

TABLE 3

Example of Request Attributes

| Pre-authentication | Location information | City, State, Country information and confidence factors<br>Connection type<br>Connection speed<br>IP address, routing type, and hop times<br>Internet service provider flag<br>Autonomous system number<br>Carrier name<br>Top-level domain<br>Second-level domain<br>Registering organization<br>A list of anonymizing proxies<br>Hostnames and routers |
|---|---|---|
| | Device information | Secure Cookies<br>Flash Cookies<br>Digitally signed device<br>Device & display Characteristics:<br>Operating System characteristics<br>Browser Characteristics |
| Post-authentication | User information | User identifications<br>Valid or not valid user<br>Authentication status |
| | Transaction information | Key Value Pairs:<br>Support multiples<br>Keys can be defined using Regular Expressions<br>Values can be defined in ranges<br>Pages accessed<br>Time spent on page<br>Transactions sequences |

Figure 14:
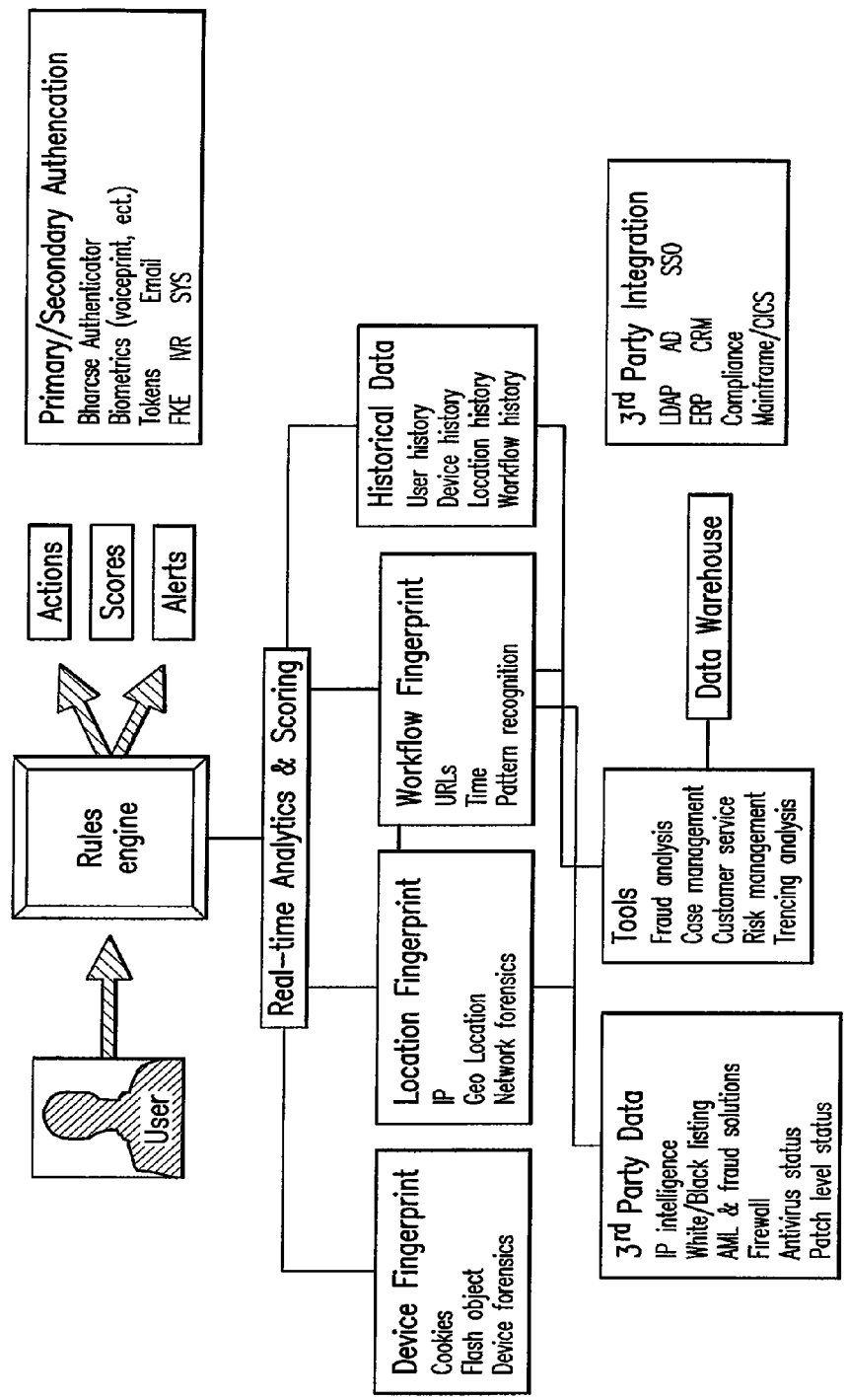
FIG. 14 illustrates a preferred function configuration of the present invention.

FIG. 14 illustrates an exemplary functional configuration including the request attributes and criteria of Table 2. The request attributes of the criteria are condensed into fingerprints: a location fingerprint, a device fingerprint, a workflow fingerprint, and an historical data fingerprint. The fingerprints are then processed to generate actions, alerts, and scores. Possible actions include primary authentication, which is the process by which the user is identified and authenticated. Primary authentication based primarily on location and device fingerprints and can include presentation of secure logon screens at the user device. Another action is secondary authentication, which can be invoked during a session if authentication confirmation or further authentication is needed. It can include use of, e.g., email, voiceprints, and the like.

This figure also illustrates that 3rd party data can be included in the evaluation process. Third party data can be incorporated in various fingerprints. For example, third party data can include the presence or absence of firewall or of antivirus software on a user device, and also and/or the maintenance status of such software. Third party data can also include IP Intelligence, risk data, historical data (from a data warehouse), fraud network data, and so forth. Further, third party describing characteristics of known risks at the location, device, or user level can be received from third party data warehouses and incorporating in various fingerprints, primarily the workflow fingerprint and the historical data fingerprint. Also 3rd party evaluation tools can integrated into or supplement the analytics and scoring process the evaluates the fingerprints.

Location information and device information are important criteria, especially in the pre-authentication period. Location information characterizes the location of the device from which a request originates. Location can most easily be estimated from the device's IP address and the hierarchy of networks linking the device to the Internet. Device information characterizes the originating device itself, such as its hardware and software components. Table 3 present a more detailed catalog of device software and hardware characteristics that can be extracted from a device by a browser-hosted process.

TABLE 4

Exemplary hardware and software characteristics

| | Device Information | HTTP Header | Flash Shared Object |
|---|---|---|---|
| Operating System | Operating System | X | X |
| | Version | X | |
| | Patch | X | |
| Browser | Browser | X | |
| | Version | X | |
| | Patch level | X | |
| | Http protocol version | X | |
| Hardware | Screen DPI | | X |
| | Has Microphone | | X |
| | Has Printer Support | | X |
| | Has Audio Card | | X |
| | Screen Resolution | | X |
| | Screen Color | | X |
| Software | Has Audio Encoder | | X |
| | Supports Video | | X |
| | Has MP3 Encoder | | X |
| | Can Play Streaming Audio | | X |
| | Can Play Streaming Video | | X |
| | Has Video Encoder | | X |
| Location | Location | X | |
| | Language | X | X |
| | Language Variant | X | |

A further important component of device information when available is a secure token, e.g., a secure cookie, available from a device which has been previously used as a user device. When a request is received from and device, at least the available location and device information can be summarized, condensed, or fingerprinted and stored back on the device as a secure token. If another request then originates from this device, the secure token can be retrieved and its contents compared against the currently-collected location and device information. Any mismatches can be weighted to form a score for use in risk analysis. Whether or not mismatches occur, a new secure token is generated from the currently-retrieved information and stored back on the device.

Such a secure token also advantageously includes a unique identifier generated by the methods of this invention. Comparing the unique identifier in a retrieved token with an expected or known unique identifier provides further information on which to base the score. Also, a unique identifier is particularly useful if location or device information cannot be obtained from a user device. Then the unique token can be the only identifying device information.

Preferred post-authentication information includes user information and transaction (or workflow) information. User information includes user identification and the progress of a user through the user authentication process. Transaction information includes information extracted from a requested transaction and the sequence and timing of transactions. Information is preferably extracted from a transaction request by looking for key expressions and then extracting the values (perhaps only ranges of values) and other information associated with the key. Sequence and timing of transactions and of web pages visited is packaged into workflow fingerprints which are summaries of a users historical usage patterns.

FIG. 14 also indicates that the criteria data, packaged into fingerprints as already described, is processed and scored in real-time by fraud analytics driven by a rules engine. In order to provide authentication services concurrently to multiple service providers and service provider applications, the analytics and the rules defining this processing are preferably grouped into functionally related modules that are seen as substantially interchangeable by the rules engine. Thus authentication services can be provider to various service providers by having a generic rules engine (or a few instances of a generic rules engine) switch between modules. Each service provider can define its own authentication services by providing or more of this modules.

Analytics are thus preferably implemented in groups what are known herein as policies. Table 5 illustrates preferred policies that are useful for most systems. Other systems can have some or different policies as needed.

TABLE 5

| | Policies |
|---|---|
| Security policies | Anomaly detection |
| | Misuse detection |
| | Intrusion detection |
| | Predefined hacker models |
| | Customizable models |
| Business policies | In session transaction monitoring |
| | Business defined transaction rules |
| | Key Value driven logic |
| | Customizable models |
| | Event, time and value pattern recognition |
| Workflow policies | Historical transactions |
| | Behavioral analysis |
| | Temporal analysis |
| | Auto classification |
| | Profiles of users |
| | Predefined customizable risk models |

Policies can be enforced during pre-authentication, for example when a user is being authenticated, or during post-authentication, for example when a user is making transaction requests. The rules engine automatically determines what models to run based on the context of the request. Different sets of models can be configured to support different transaction types, e.g. bill pay, money transfer, password change, email change, etc. Since the models are defined and written in XML, after the initial integration, no code changes are needed in the service provider applications. All models can be modified using a network interface or by replacing the XML definition file. Also, new models can be added seamlessly during operation of the methods of this invention. Models are fully portable, so that they can be migrated from a simulation environment to a test and production environment. Additionally, policies can be configured for exceptions, like "user not in user list" or "device not a bank kiosk", etc.; policies can be temporarily overridden based on, e.g., time period or one time exceptions.

Briefly, security policies are applicable both pre- and post-authentication and typically seek to recognized known hacker behaviors. These behaviors can be recognized using standards developed from cross-industry best practices. Business policies are primarily applicable post-authentication when a transaction session is ongoing. These policies generally represent standards established by a particular service provider for mitigating transaction risk. Workflow policies are primarily applicable post-authentication and compare fingerprints of past transaction session activities with fingerprints of the current session in order to detect unexpected patterns that may indicate fraud.

Figure 15A:
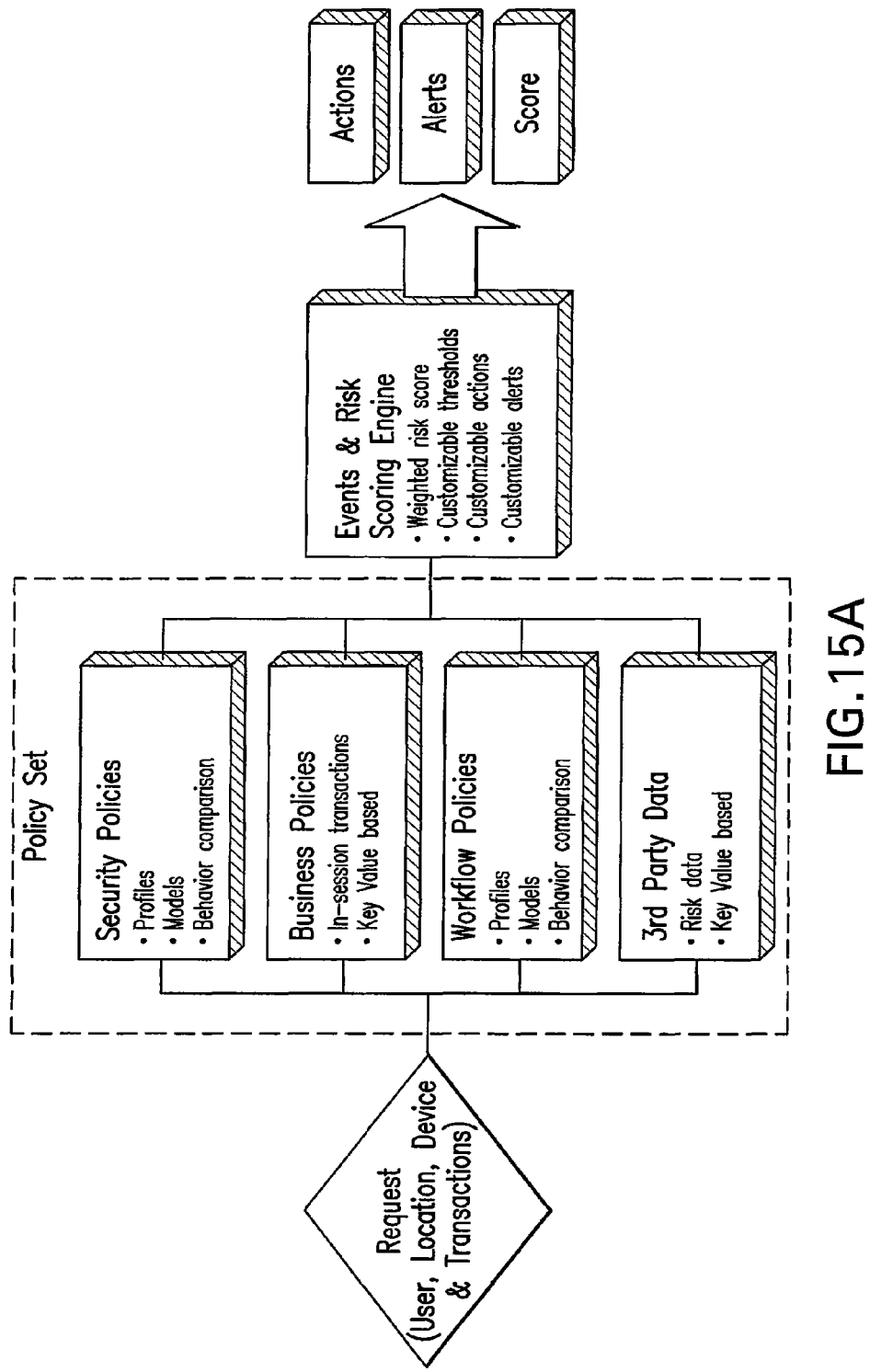
FIGS. 15A-B illustrate an exemplary policy set and an exemplary security model for inclusion within the exemplary policy set.

FIG. 15A illustrates functional configurations that implement policies, such as the policies of Table 4. Each incoming request is analyzed (preferably concurrently) according to the analytics in all the policies applicable to the authentication stage. The determination of the policies and of their analytics is then combined into a weighted risk score which is weighed against various thresholds in order to generate appropriate actions, alerts, and scores. The weightings, thresholds, actions, and alerts can be customized for each service provider.

Figure 15B:
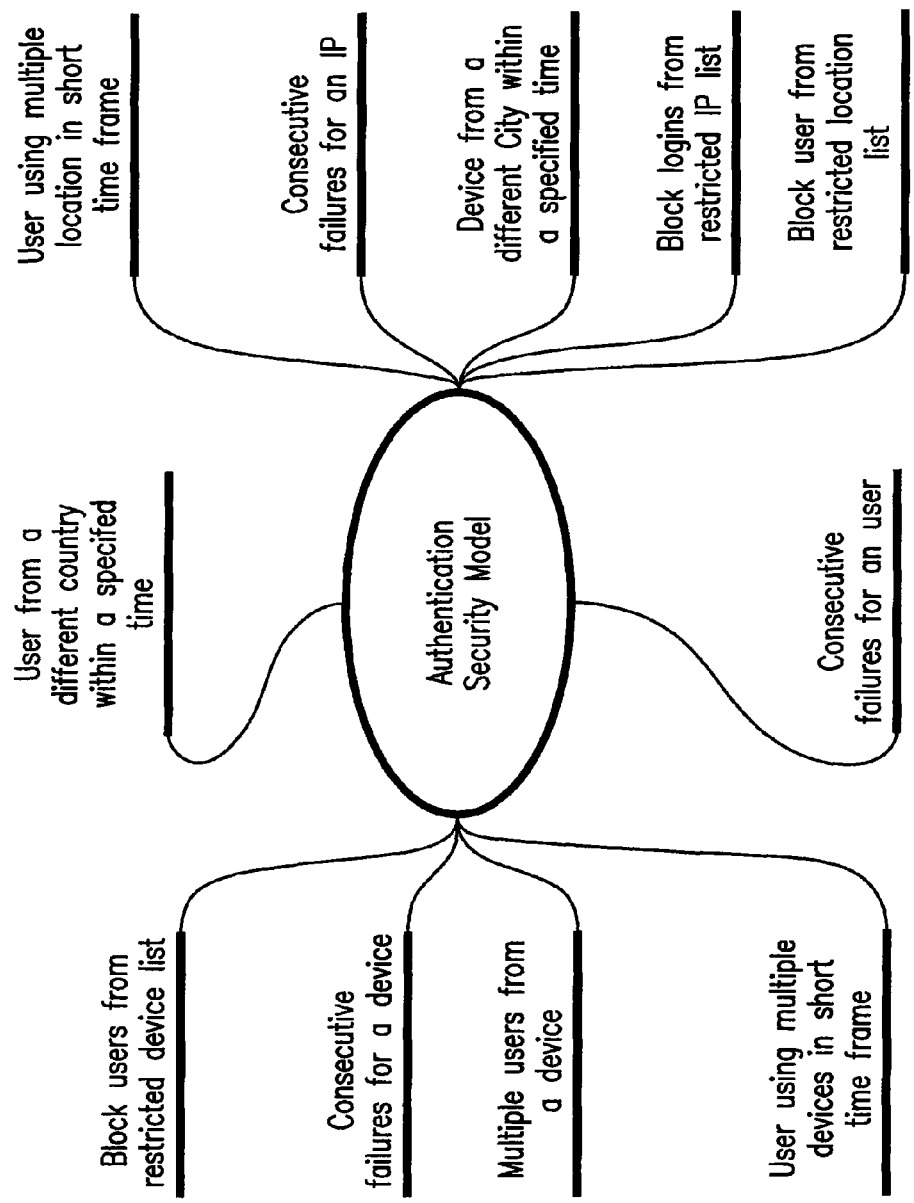

Examples of preferred security, business, workflow, and 3rd party policies are now described in more detail, beginning with security policies. Security policies can be widely applied across most service providers and service provider application and used both during pre- and post-authentications. They can be applied, e.g., during user login and during user transaction processing. Security models evaluate a plurality of data items generally from the device and location criteria which are evaluated to obtain a security score. FIG. 15B illustrates an exemplary set of such data items. For example, a user who submits requests that appear to originate from multiple machines, or multiple cities, or multiple locations over an impossibly short duration of time has been found likely to be hacker. Therefore, these and similar data items are part of preferred security models.

The security policy contains models involving decisions based on risk patterns associated with user, device and location information. The security models are based on known risk conditions and potentially risky behavior and are categorized into the following models. Tables 6A and 6B present illustrative security models.

TABLE 6A

| | Restricted model |
|---|---|
| Location based rules | Logins from restricted countries, (e.g. OFAC countries) Logins from restricted IP addresses Logins from restricted anonymizers and proxies |

TABLE 6A-continued

| | Restricted model |
|---|---|
| User based rules | Logins from restricted users list Multiple consecutive failures for the user |
| Device based rules | Logins from restricted devices Multiple consecutive failures from the device Device using stolen cookies User using the device for the first time |

TABLE 6B

| | Hacker model |
|---|---|
| Location based rules | User login from different geographical location (city, state or country) within a given time period Multiple logins from a given IP address within a given time period |
| User based rules | User login from different geographical location (city, state or country) within a given time period |
| Device based rules | User login from different device within a given time period Multiple failures from a given device within a given time period Multiple logins from a given device within a given time period Same device used from different geographical location within a given time period |

A service provider may find certain conditions associated with a user request require that this user's access must be prevented. Restricted models gather data items and factors relevant to determining that a particular access must be prevented. Alternatively, a service provider may find certain user behavior patterns suggest that this user is a hacker or malicious. Hacker models accordingly gather relevant data items and factors.

TABLE 7

| Sample security policy data items | | | | |
|---|---|---|---|---|
| Timed city for user | USER: from City | rule.type.enum.user | Check whether the last login attempt for the user | {Seconds elapsed} |
| Timed country for user | User: from Country | rule.type.enum.user | Check whether the last login attempt for the user | {Seconds elapsed} |
| Timed device for user | USER: From Device | rule.type.enum.user | Check whether the last login attempt for the user | {Seconds elapsed} |
| Timed IP for user | USER: From IP | rule.type.enum.user | Check whether the last login attempt for the user | {Seconds elapsed} |
| Timed IP Class C Address for user | USER: IP Subnet | rule.type.enum.user | Check whether the last login attempt for the user | {Seconds elapsed} |
| Timed state for user | USER: From State | rule.type.enum.user | Check whether the last login attempt for the user | {Seconds elapsed} |
| Digital Cookie mismatch | USER: Cookie Mismatch | rule.type.enum.device | Checks whether the cookie the user sent | |
| Attempts not status for device | DEVICE: Logins with false Status | rule.type.enum.device | Maximum login attempts with other than the given | {authentication status} {Last number of attempts} |
| Attempts status for device | DEVICE: Logins with true Status | rule.type.enum.device | Maximum login attempts with the given status for | {authentication status} {Last number of attempts} |
| In group for device | DEVICE: In Group | rule.type.enum.device | If the device is in the | {Group ID} |
| Timed user number for device | DEVICE: Max Users | rule.type.enum.device | Maximum users using this device for the past x | {Seconds elapsed} {The maximum number of |
| Fully Fingerprinted | DEVICE: Is Fingerprinted | rule.type.enum.device | Checks whether the user was identifiable from all | |
| In ip group for location | LOCATION: from IP | rule.type.enum.location | If the IP is in the IP | {Group ID} |
| In range group for location | LOCATION: from IP range | rule.type.enum.location | If the IP is in the IP range | {Group ID} |
| Multiple users using the same location | LOCATION: Max Users | rule.type.enum.location | Maximum number of users using the current ip | {Seconds elapsed} {The maximum number of |
| Not in ip group for | LOCATION: not in IP | rule.type.enum.location | If the IP is not in the IP | {List ID} |
| Not in range group for | LOCATION: not in IP | rule.type.enum.location | If the IP is not in the IP | {List ID} |
| IP in city | LOCATION: in City | rule.type.enum.location | If the IP is in the given | {Group ID} |
| IP in country | LOCATION: in Country | rule.type.enum.location | If the IP is in the given | {Group ID} |
| IP in state | LOCATION: in State | rule.type.enum.location | If the IP is in the given | {Group ID} |
| IP not in city | LOCATION: not in City | rule.type.enum.location | If the IP is not in the given | {Group ID} |

TABLE 7-continued

Sample security policy data items

| IP not in country | LOCATION: not in | rule.type.enum.location | If the IP is not in the given | {Group ID} |
| IP not in state | LOCATION: not in State | rule.type.enum.location | If the IP is not in the given | {Group ID} |

These data items are assembled from the location, device, and user criteria (as indicated in column 2). The user-type data items generally test whether or not a particular user's behavior suggests a likely malicious intent. The device-type data items generally test whether or not a particular device has been used and/or is being used in a manner that suggests it has been accessed by users with a likely malicious intent. For example, a device is suspect if it is one from which rejected login requests have originated in the past or which has been accessed by an unidentifiable of suspect user. These data items also include the device ID or fingerprint if available from the device. The location-type data items generally test the association of a device or a user with an IP address. For example, a user or device may be suspect if their requests originate from multiple IP addresses, or from new IP addresses, or the like.

Associated with a security model, such as the model of FIG. 15B or of Table 7, are evaluation rules which, in a preferred embodiment, provide a score reflecting the likelihood that a current request is a security problem. Tables 8 and 9 present exemplary security evaluation in the form of decision tables. The illustrated decision process is hierarchically arranged (or nested) in which Table 8 invokes further checks, such as the checks of table 9, if certain conditions are found.

TABLE 8

Primary device decision table
Data item

| Secure cookie | Flash cookie | Flash data | Browser characteristics | Operating system characteristics | Score |
|---|---|---|---|---|---|
| * | * | * | * | * | 0 |
| X | * | * | * | * | PATTERN CHECK |
| M | * | * | * | * | SECONDARY CHECK |
| X/M | X | * | * | * | PATTERN CHECK |
| X/M | M | * | * | * | SECONDARY CHECK |
| X/M | X/M | X | * | * | PATTERN CHECK |
| X/M | X/M | M | * | * | SECONDARY CHECK |
| X/M | X/M | X/M | M | * | SECONDARY CHECK |
| X/M | X/M | X/M | X/M | M | 10 |

Key:
X = missing;
M = present and mismatched;
* = present and matched

This table returns a score of "0" (a score indicated a low likelihood of fraud) in case all evaluated data items are present and match in connection with a current user request. If no data item is present or if all data items do not match, a score of "10" (a score indicated a high likelihood of fraud) is returned. In case where some data items are present and match while other data items are absent or do not match, this table invokes further checks. If the retrieved data tokens that were previously stored on a device by this invention, e.g., a secure cookie, a Flash cookie, or Flash data, are not present, a further pattern check is performed. The pattern check examines the particulars of the pattern of the location and device criteria and assigns an appropriate score. If data contained in the data tokens does not match current location and device criteria, a further secondary check is performed.

The secondary check examines the particulars of the how the data contained in a retrieved data token does not match the criteria associated with a current user request. Table 9 an exemplary decision table which implements such a secondary check.

TABLE 9

Secondary device decision table
Secure Cookie Mismatch

| Prior Cookie (same device) Browser Characteristics | TRUE Operating System | ASN | ISP | IP | Location | Score |
|---|---|---|---|---|---|---|
| T | T | T | T | T | T | 0 |
| F | T | T | T | T | T | 5 |
| X | T | T | T | T | T | 5 |
| T | F | T | T | T | T | 10 |
| T | X | T | T | T | T | 0 |
| T | T | F | T | T | T | 10 |
| T | T | X | T | T | T | 0 |
| T | T | T | F | T | T | 5 |
| T | T | T | X | T | T | 0 |
| T | T | T | T | F | T | 5 |
| T | T | T | T | X | T | 0 |
| T | T | T | T | T | F | 5 |
| T | T | T | T | T | X | 0 |
| F | F | F | F | F | F | 10 |
| X | X | X | X | X | X | 10 |

KEY
T = True
F = False
X = Missing

In this table, ASN abbreviates "autonomous system number"; ISP abbreviates "Inernet service provider"; and IP stands for IP address (all of which are well known in the communication arts). A preferred indication of message origin results from combining the message's ASN, ISP and IP (in contrast to, e.g., only the IP address). If a secondary check is called for, e.g., as a result of a secure cookie mismatch, the indicated data items are gathered and a score determined from the table and returned to primary decision table invoking the particular secondary checks. A single secondary check can be invoked by different primary decision tables and different time.

Business policies generally include rules (referred to as "transaction rules") that evaluate parameters of individual in-session transactions for the likelihood of fraud or malicious intent. Accordinly, business policies are generally application during post-authentication are generally specific to the field or to the business of the service provider and service provider application. For example, in a banking application, specific transaction rules can be directed to specific banking transactions, e.g. bill pay, transfer funds, and the like. Transaction models can be used in conjunction with security rule, e.g. don't allow (or challenge user for) money transfer request from an international IP address. Business policies can be shared by different service providers in a particular field, or can created and customized for a specific service provider.

Table 10. For example, a particular banking service provider may have determined that certain transaction data indicate that the transaction should be restricted or rejected. Table 10 present exemplary rules that evaluate conditions that can indicate a transaction should be restricted, challenged or rejected.

TABLE 10

Restricted business policy model rules

Money transfer request is greater than a certain dollar amount
Money transfer request to and from a specific suspected fraud or an international account
Money transfer request of a certain dollar amount by a user who is logged in from another country
Bill payment to a non-merchant account is greater than certain dollar amount
Transaction from an un-registered device/location or frequently used fraud device/location. This could trigger a customer service request or challenge question or an out of band phone authentication Workflow policy contains models that evaluate groups or sequences of related transactions, e.g., transaction requested by a particular user, that indicate expected behavior patterns. These rules are preferably based either of expectations for a typical user of a given class or upon historical describing a particular user. Conversely, rules in workflow policies can indicate unexpected behavior that may indicate malicious intent. For example, if a user routinely requests account transfers in a certain range, then a transfer far out of this range can indicate risk. Alternately, if a user routinely makes money transfers of amounts greater than an expected average, future transfers in the part range do not necessarily indicate risk, and appropriate rules can be advantageously relaxed for the user.

Table 11 presents examples of rules that indicate that a requested transaction may be fraudulent or malicious and should be restricted, challenged or rejected.

TABLE 11

Restricted workflow model rules

More than average number of transactions performed by the user. This could be on a daily, weekly, monthly, quarterly and yearly basis
Other than the normal time of the day the user does his/her transactions
Other than normal day of the week or week of the month the user does his/her transactions
Irregular pattern for transaction type and dollar amount A further type of policies and models are applicable in situations where data from 3rd party databases is useful for evaluating risk. For example, relevant rules can block or restrict logins or transactions based on input from a 3rd party database of black-listed IP addresses. Additionally, relevant models can be based on fraud patterns or models available from external databases. Embodiments of the present invention maintain databases useful evaluating transaction and provide methods for generating and simulating patterns of fraudulent behavior.

The above has described the structure of criteria, policies, and models. In operation, specific instances of these data and rule classes are created and filled in for specific devices, locations, users, requests, service providers, and the like, that become known during the course of providing authentication services. These are generically referred to herein as "external objects". To aid in providing more easy customization of the authentication services for individual service providers, the created instances are grouped together and evaluated (to the extent possible) as members of groups. The groups correspond to the particular criteria items and are linked to compatible models containing rules used to evaluate activity.

Figure 16A:
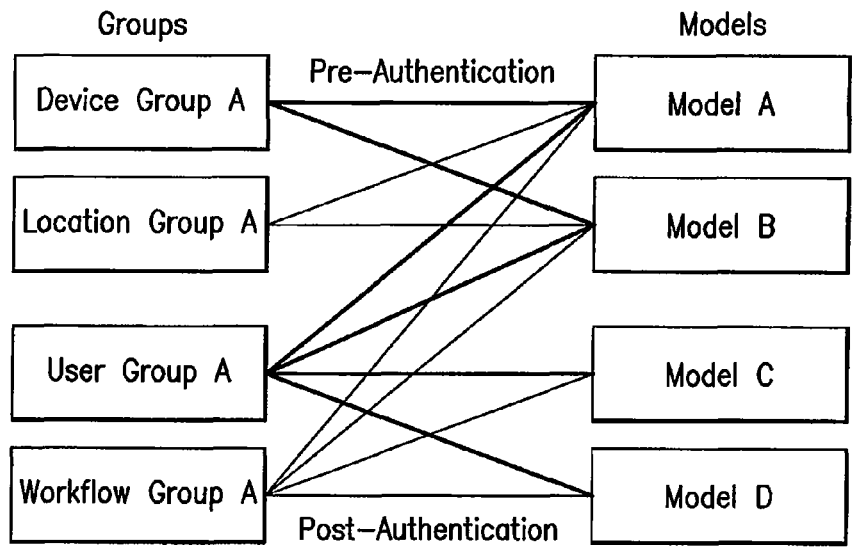
FIGS. 16A-C illustrate a preferred structure for the external objects and models of the present invention.
Figure 16B:
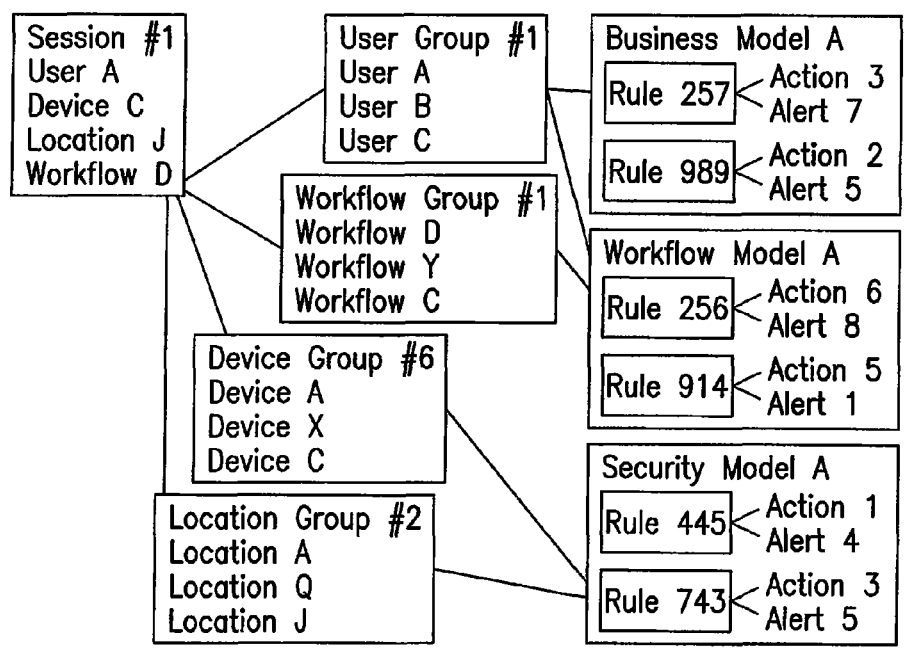
Figure 16C:
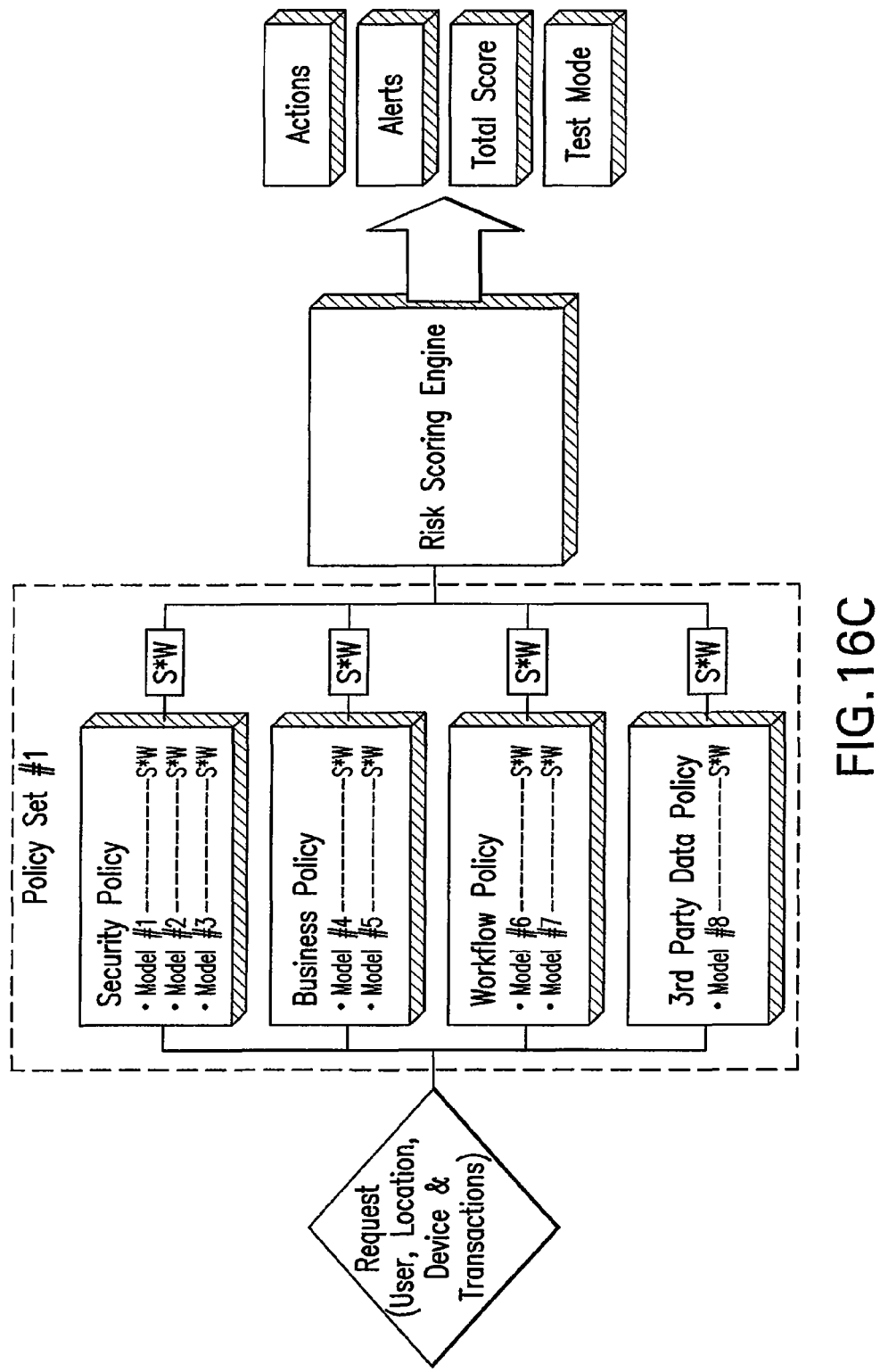

FIGS. 16A-C illustrate one preferred model for linking external object groups and specific external objects to models specifying evaluation and action rules. A model is a collection of configured rules. A model contains any of number of rules. FIG. 16A illustrates that possible (e.g., recognized in the past) devices, locations, users, and workflows (preferably, workflow fingerprints) are each assigned to certain respective groups of these objects. These groups of possible external objects are also linked to models that group related evaluation rules and strategies, e.g., decision tables that emphasize selected data items. Different service providers can then chose select different ones of the linked models to be used for evaluating their requests. Also, different service providers can provide their own models (or direction for their creation) for linking to external object groups.

FIG. 16B illustrates an example of particular external object representations that might be created for user transactions submitted in a particular session. The illustrated session represents a particular workflow being submitted by a particular user at a particular device in a particular location. The particular user, device, location and workflow are instances of the illustrated groups of these respective external objects. These groups are linked to evaluation models containing evaluation rules. Preferably, the device and location groups are linked to one or more security model groups, while the user and workflow groups are linked to one or more business models and/or workflow models. The illustrated business models contain the indicated evaluation rules, which may cause the indicated action or alerts according to the circumstances. Optionally and for further economy of specification, models can be grouped into policy sets, which typically contain one model of each type. Then external objects can be linked to policy sets instead of to individual models.

A policy set holds all the policies, models and rule instances used to evaluate a total risk score. Multiple policy sets can be configured, tested and stored but in preferred embodiments only one policy set can be actually used at one time. Each policy set generally contains four types of policies, e.g., security policies, business policies, workflow policies, and 3rd party policies, with each policy type representing models based on the type of policy.

FIG. 16C illustrates processing of a single request through this structure. Data defining an incoming request is used to update the models in the policy set associated with this request. These data updates can cause the risk/rules engine to be triggered. The risk/rules engine may then output an action, an alert, of a score as called for.

In more detail, the groups, model, and rules can be customized according to business need, to become activated if a transaction is scored above a certain risk threshold. Table 12 presents some exemplary rule types.

TABLE 12

Temporary allow/suspend rules

Per user basis
Single or multiple rules
Time or count based

Further, models can be nested to ensure higher degree of accuracy for the risk score. A nested model is a secondary model used to further quantify the risk score, in instances where the original results output by the system are inconclusive. A nested model is run only when a specific sequence of answers is returned from the primary model. Nested models therefore reduce false positives and negatives and serve to ensure overall accuracy of the risk score. If a service provider does not wish to assign a risk score or nested model for particular criteria and data combinations, default weights are attached to each attribute. This further ameliorates customization requirements.

It will be apparent that this hierarchical structure is well suited to allowing easy customization, service providers need only specify the general goals for their authentication services while the particular details are hidden in system groups. It will be also apparent that this model is suited to implementation by object oriented programming techniques. The system rules engine directs gathering criteria data, creating external objects, and processing rules.

The rules engine (FIG. 14) analyzes models and policies and their data elements in advance of their use During authentication servicing, the rules engine triggers model processing when it recognizes pre-analyzed data elements that are relevant to a pre-analyzed service provider model. transactional data flows to identify those elements that may impact the models. After triggering, the models execute and provide risk scores, and actions and alerts if called for. New or changed parameters and data are maintained so that they can be tested when new data is next recognized or a model is next triggered. For example, if new data is within certain ranges of old data, the associated model may not need to be triggered.

Table 13 present one preferred architecture for the rules engine.

TABLE 13

Rules Engine Architecture

Expert core
Interface
Semantic framework
XML/Native/XLS adapters

In preferred embodiments, the rules engine provides external interfaces structured by known formatting languages and conventions. Methods contained in the expert cores are designed to allow service providers to accurately recognized likely fraud and malicious intent.

In more detail, the following are examples of core methods. One exemplary method is known as "time over threshold". This method compares the value of a variable to a pre-defined threshold at each transaction and reports if the value has been out of range for too many transactions. Thus, rather than triggering a model each time the threshold is crossed, recent historical data is used to sort out persistent problems. Thus time over threshold eliminates unnecessary alert and actions. Another exemplary method is known as "deviation from normal". This method, instead of comparing current actions to fixed thresholds, employs uses historical data to establish normal for specific days, times, users, devices, workflows, and the like. It then assesses whether the current behavior is deviating from what is normally in similar circumstances.

Another exemplary method is known as "event state". This method maintains states for external object which store past alerts and actions. Then, a failing rule generates a single alert on the first failure. Subsequent failures will not generate additional alerts until a selected interval has passed from the first alerts. If the rule subsequently succeeds, the alert will be cleared. Another exemplary method is known as "event rate". This method generates alerts only after a selected event has occurred too many times in a part selected time interval. For example, if a login failure occurs more than three times in one hour, an alarm or alert is generated indicating that an intruder may be trying to access the system. However, subsequent login failures during the predetermined time period would not generate additional alarms, nor would less than three login failures. A further exemplary method is known as "event time over threshold". This method generates an alert when the rate of traps received exceeds a threshold rate for a period of time. For example, network links frequently go up and down, so it is distracting if an alarm is generated every time a link cycles. However, if the network link has failed for, e.g., ten or more minutes in an, e.g., hour, then availability may be is impacted and an alert generated.

Preferred Software Configurations

Figure 11:
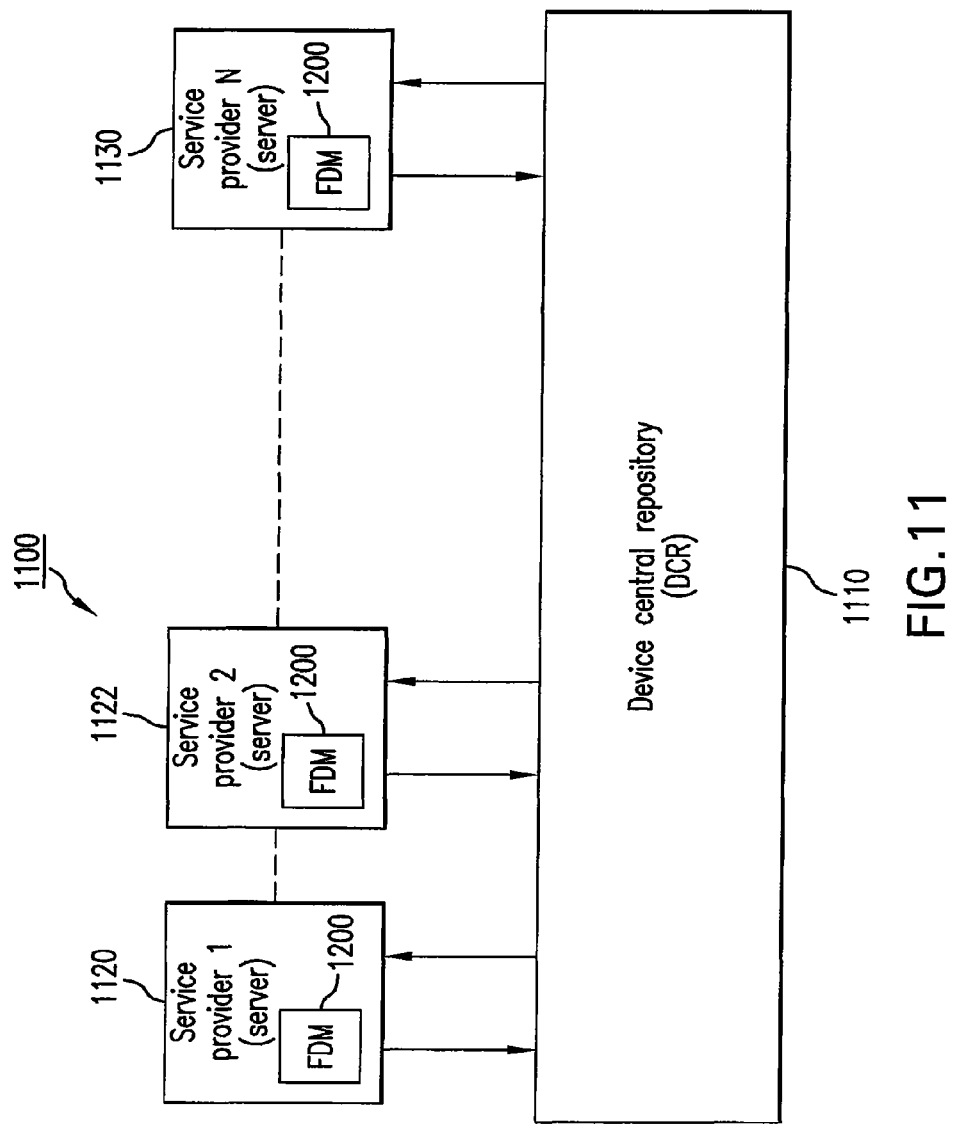
FIG. 11 is flowchart illustrating an exemplary device central repository (DCR) system and method according to an embodiment of the present invention.
Figure 12:
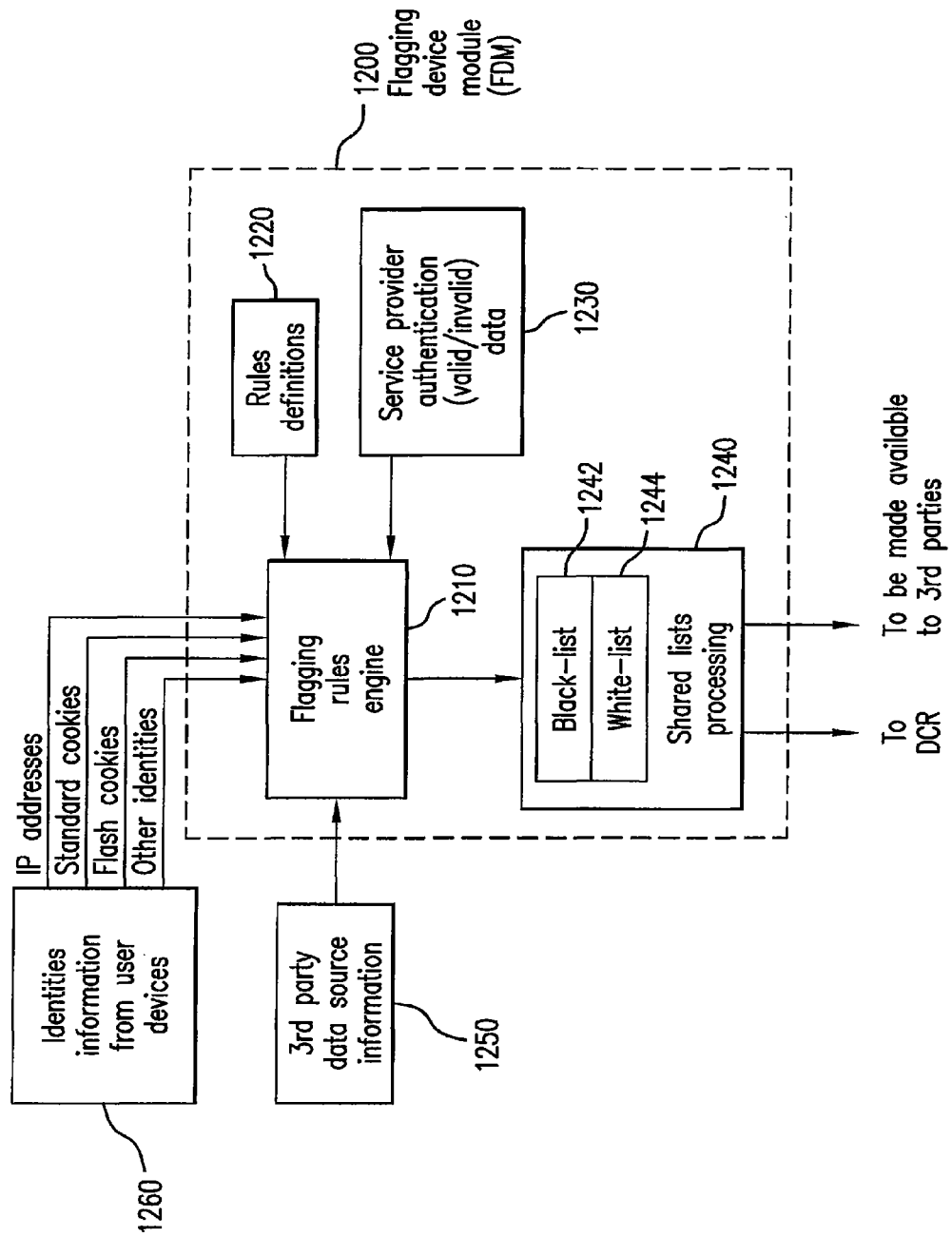
FIG. 12 is a block diagram illustrating an embodiment of the flagged devices module (FDM) of FIG. 11.

The individual components of the methods and systems of this invention, which have been briefly described above, are now described in more detail: the fingerprint process (with reference to FIG. 4A), then the FAAS process (with reference to FIGS. 5 and 6), then the authenticator process (with reference to FIGS. 7-10), then the DCR server (with reference to FIG. 11), and lastly the FDM process (with reference to FIG. 12). User devices are preferably identified using secure cookies, Flash cookies, and similar data tokens combined with other data items such as browser characteristics, device hardware configuration (e.g., as acquired using Flash calls), network characteristics, and the like. Device identifying data is evaluated by a configurable set of nested rules that identify a device and also check historical logins from this device for accuracy, including handling exception cases where cookies are disabled, out-of-sync cookies and also potentially identifying fraudulently stolen cookies.

Figure 4A:
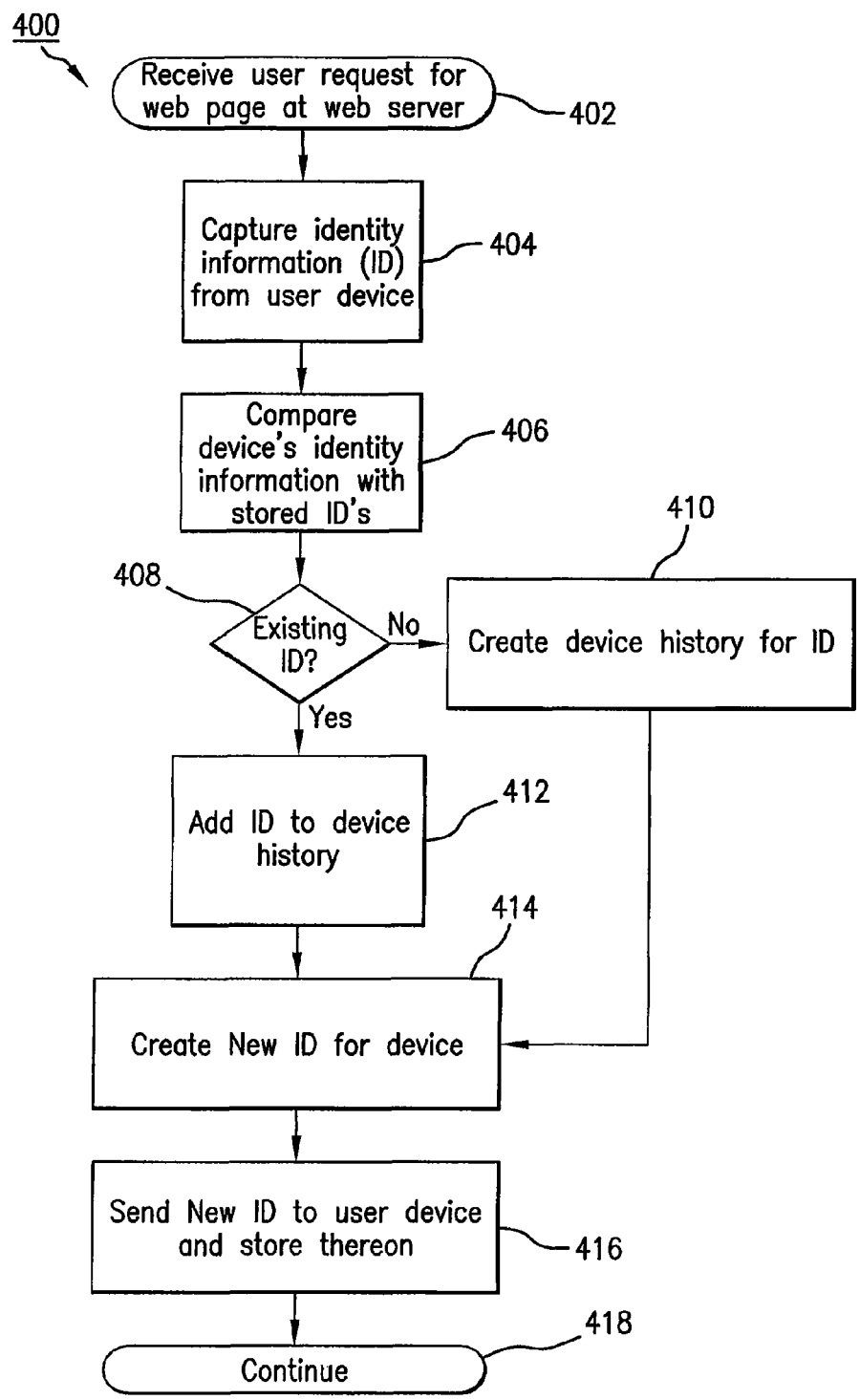
FIGS. 4A-B illustrate flowcharts depicting an exemplary embodiment of the fingerprinting aspect of the system and method of the present invention.
Figure 4B:
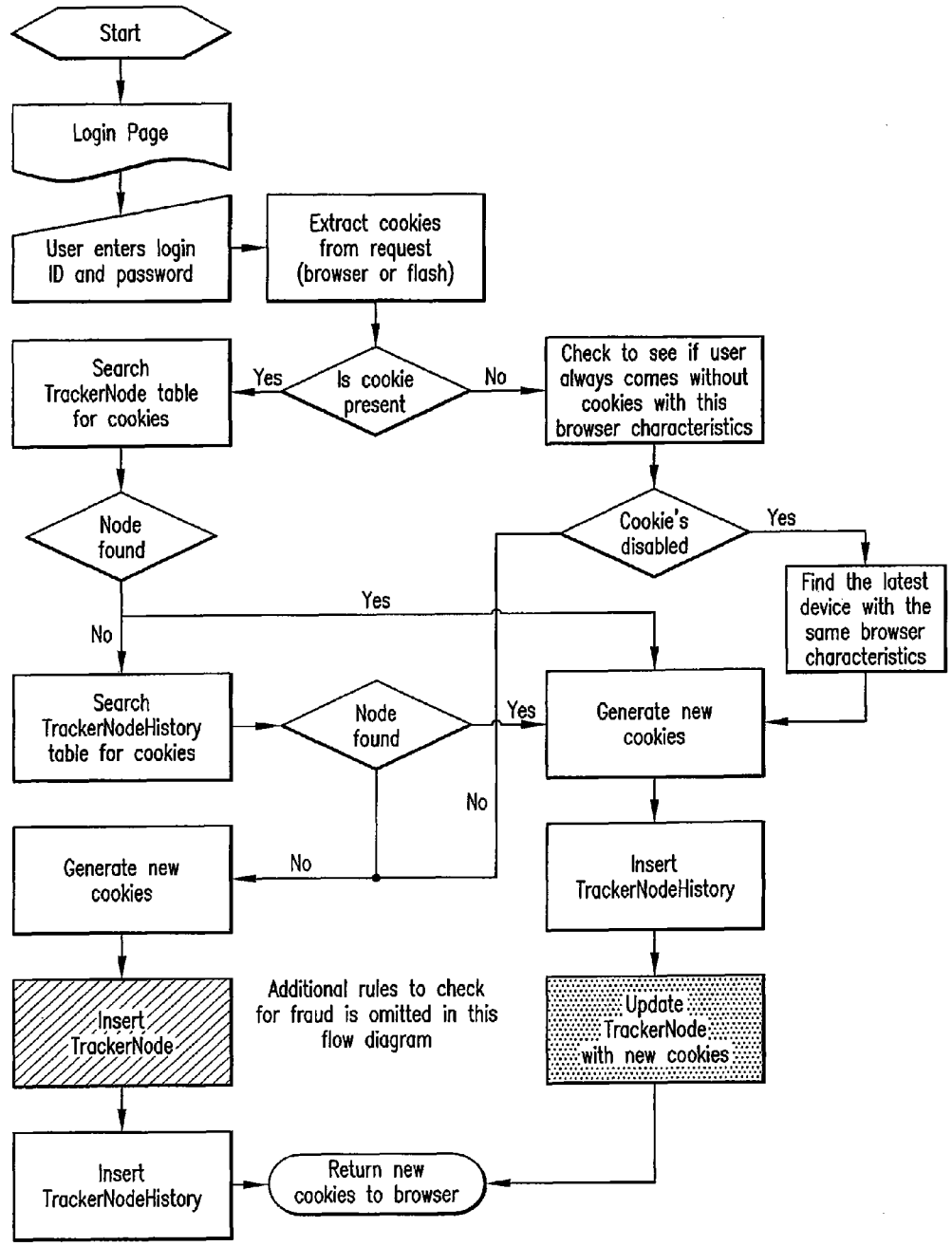

FIGS. 4A-B are flowchart illustrating exemplary embodiments of the device fingerprinting process 400 of the system and method of the present invention. FIG. 4A presents a more general view of device fingerprinting, while FIG. 4B is a refinement of FIG. 4A presenting a more detailed view of one preferred embodiment of device fingerprinting. This description will refer primarily to FIG. 4A, similar steps in FIG. 4B being then readily apparent. In Step 402, a request is received at a service provider server from a user device 720 (FIG. 13A), for example, for data resident thereon. The fingerprinting process is invoked and information describing the request is transferred. The user device may be a personal computer 720 as in FIG. 13A, a cell phone, personal data assistant (PDA), automated teller machine (ATM), or other suitable device capable of accessing a server. Preferably, the service provider server is a web server accessible from the user device via the Internet, or other public network, or a private network.

In Step 404, device identity information for the user device is captured. This information can be captured by a client program already resident on the user device. For Internet applications, the client program is commonly a web browser. Alternately, a software module can be downloaded to the user device and executed to gather identifying information. For Internet applications, the software module can be a plug-in, a script, or an applet (e.g., a Java applet) downloaded by the web browser and executed. The identity information gathered is selected to identify the user device as uniquely as possible. Preferably, the device can be uniquely identified within those user devices that access the server application. If insufficient information is available for unique identification, the user device is identified as narrowly as possible, e.g., by the values of specific properties that vary widely among possible user devices. Identity information can be augmented by data generated by the fingerprinting process itself, e.g., a unique bit string, such as a large random number. Some or all of the device identity (along with identifying information generated by the fingerprinting process) information is stored in a data token referred to as a "Device ID". APPENDIX A to this section present particular examples of data elements and evaluation rules useful in a particular preferred embodiment of device fingerprinting.

Generally, the captured device identifying information includes the following. A first type of device identifying information is a secure, persistent data token that has been previously stored on the user device. Secure persistent data includes generally data elements that are encrypted, signed, or otherwise secured against modification, and that remain resident on the user device even when it is not accessing a service provider application. This data may have been previously stored on the user device by the service provider server application, in which case it often identifies the user who accessed the service provider. This data may also have been stored by the fingerprinting processes of this invention during the course of a prior identification of this device, in which case, it preferably includes the "Device ID".

Although, any technique that allows a remote application to store and retrieve persistent data on a user device can be used, it is preferred to use known and widely available techniques. One such technique is known as "secure cookies". A standard cookie is a data packet sent by a web server to a web browser for saving to a file on the host machine. The data packet can be retrieved and transmitted back to the server when requested, such as whenever the browser makes additional requests from the server. A secure cookies refers to a standard cookie that has been secured against modification or tampering.

Another such technique is known as "flash cookies". Graphical software applications and/or plug-ins from Macromedia, and generally identified by the trade name "Flash", are currently resident on many user devices. This software can create local shared objects, known as "flash cookies", for maintaining locally persistent data on a user's device akin to the standard "cookies" stored by web browsers. Flash cookies can be stored locally on a flash plug-in user's device, are updatable, and have the advantage not being as easily removed from the user's device as are standard cookies.

A second type of device identifying information are the hardware characteristics of the user device and/or of the user device's network connections. Many types of hardware characteristics can be gathered for device identifying purposes, including: IP addresses, adapter MAC addresses, local time and/or time zone, network connection speed such as download and/or upload times, microprocessor type and/or processing and/or serial number, and so forth. Software for gathering such information is described in the APPENDIX B to this section.

Figure 6:
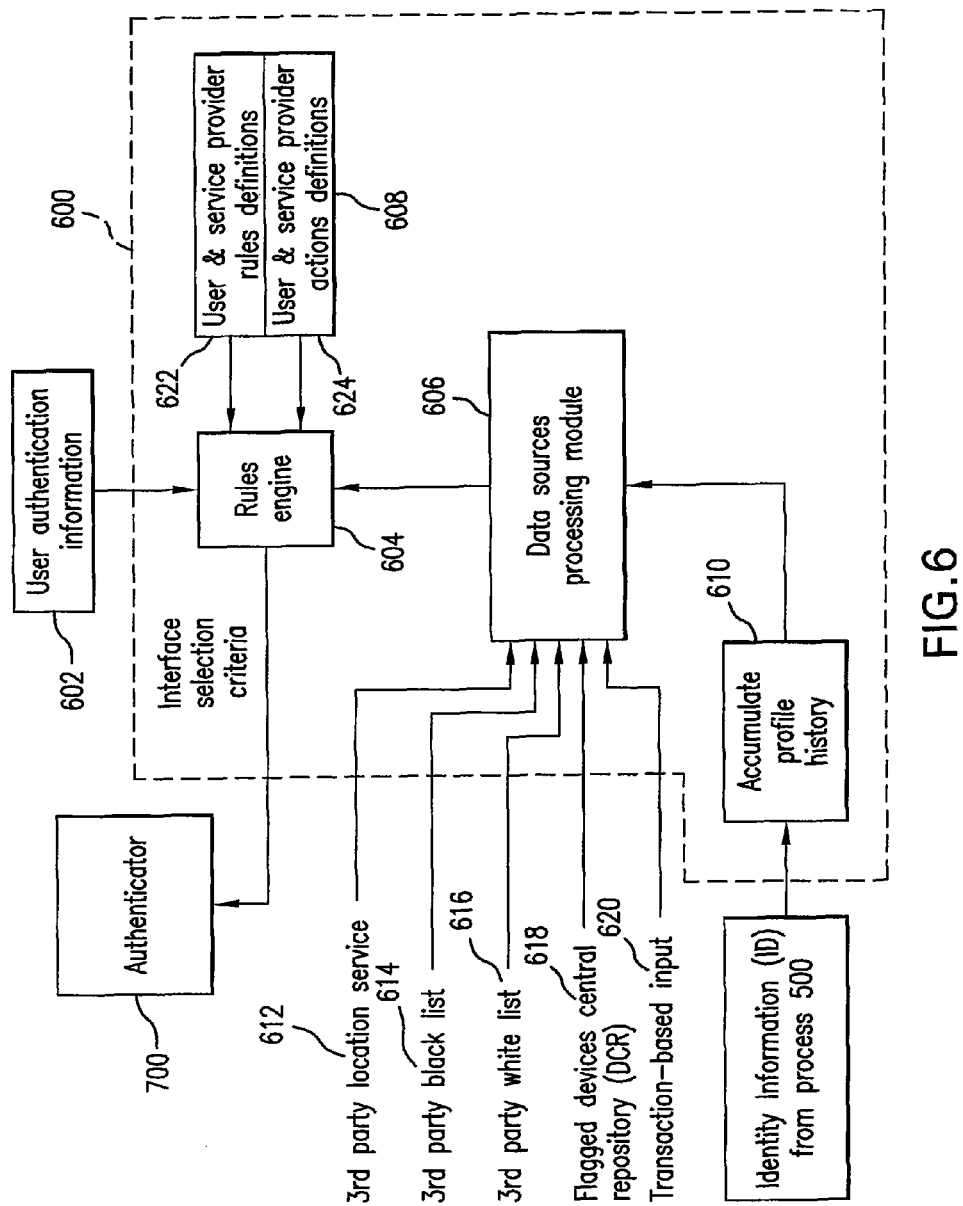
FIG. 6 illustrates a Fraud Analyzer and Alert System (FAAS) aspect according to an embodiment of the present invention.

In step 406, the captured device identity information (ID), including any previously stored Device ID, is compared to identity information that has previously been stored by the FAAS process in a database referred to as a "device/profile history" (see 610 in FIG. 6 where the device/profile history is referred to as "profile history"). The device history/profile database includes record(s) associated with and describing previously recognized and/or identified devices. If it can be established, test 408, that the captured device information corresponds to information previously stored for a device, the new identifying information updates the device history record for the device in step 412. One test is matching a unique bit string previously generated by the fingerprint and stored on the user device and in the device history. If there is no corresponding record in the device history database found during test 408, the a new record is created with the new identity information in step 410.

Lastly, a new Device ID token is created for the device in step 414, and in step 416 is sent to the user device and stored thereon, e.g., as a standard cookie or as a flash cookie. If no Device ID was found on the user device, a new Device ID token is created from the gathered identifying information. If a Device ID was found, it can be updated, e.g., with a new unique bit string, new timestamp, and so forth. At step 418, the process continues.

A feature of the invention relates to the replacement of the cookie on the user's machine upon each login. This provides further security so that even if a user's machine information is improperly acquired by a third party, even including that embodied in a previous cookie, the authentication system can identify that the user is not authorized and deny access to the system. Of course, access by a different computer often occurs for certain users, and secondary security protocols can be provided to allow access to authorized users. In addition, if access is allowed from a user on a different computer, this can be identified by the software with an implementation of a higher risk of security when the user tries to access applications or other files in the system. Cookies, and device token generally, are also stored for comparison with the token when later retrieved. Thus, stolen fingerprints, tokens, or device ids cannot be fraudulently reused.

Figure 5:
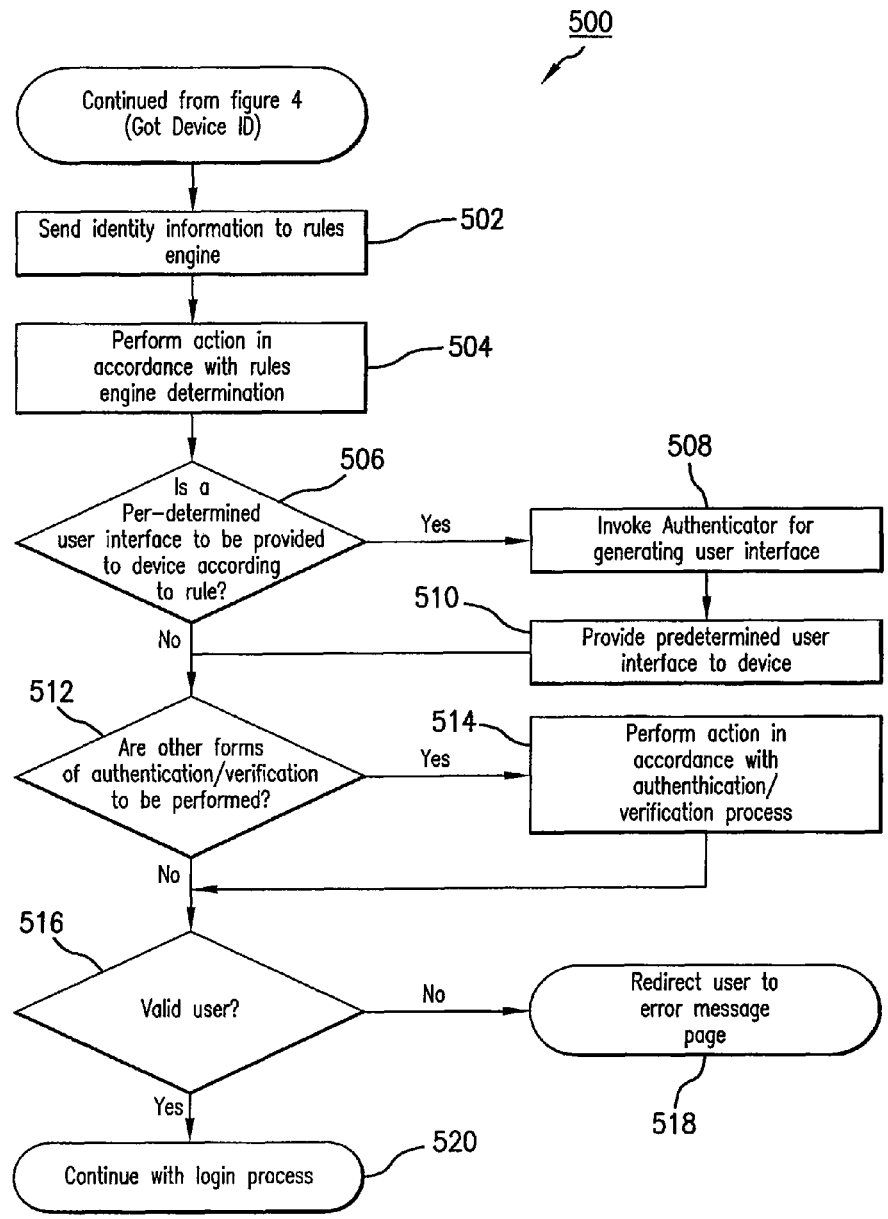
FIG. 5 illustrates a flowchart depicting a process illustrating an exemplary embodiment of the system and method of the present invention.

The fraud analyzer and alert system (FAAS) process, which is invoked by the fingerprinting process, is described with reference to FIG. 5, illustrating an exemplary flowchart for this process, and with reference to FIG. 6, illustrating an exemplary implementation of this process. Generally, the function of the FAAS is "to represent" the user's and service provider's instructions concerning how best to carry out authentication in view of risk information relating to the device making an access request and optionally in view of the nature of the request. In the preferred embodiments, the user's and service provider's instructions are represented by rules. A rules engine component of the FAAS evaluates access requests in view of available fraud risk information in order to determine authentication interface selection criteria. In alternate embodiments, other techniques can be used to evaluate access requests and to determine interface selection criteria. For example, the rules and rules engine can be replaced by statistical analysis techniques, neural network techniques, and so forth. See, e.g., Duda et al., *Pattern Classification, Wiley-Interscience,* 2nd ed., 2000.

Turning to FIG. 6, FAAS 600 is illustrated and described with reference to its inputs, outputs, internal data structures, and processing components. Most external inputs are processed by the data sources processing module 606. This module receives external data and formats and/or otherwise prepares it for use by the rules engine 604. One external input is the device identifying information just gathered by the fingerprinting process 500 concerning the device from which the current access request originates. This gathered information preferably includes (and/or is encapsulated in) the Device ID and also can include IP addresses, secure and Flash cookies, CPU type, etc. This identifying information is used to cross reference the device/profile history database 610 in order to determine if the current device has previously accessed the service provider system. If so, information stored therein and associated with the current device, e.g., risk information, is retrieved and input to the data sources processing module. The device/profile database is updated with the current identifying information. Where a device cannot be uniquely identified, this information refers to a group of similar devices including the current device.

Another external input to the data sources processing module from the service provider system is transaction-based input 620. Transaction-based input 620 comprises input regarding the specific transaction being requested by a user device, e.g., purchase amount, transfer amount, type of transfer requested, for which a service provider or user may wish to handle specially by storing a rule in rules definition module 608. For example, the service provider may wish to receive an alert and/or invoke a higher security authentication interface before purchase requests over a certain amount are sent to the server.

Another external input to the data sources processing module is from a flagged devices central repository (DCR) 618. The DCR is a database of historical fraud risk information derived from the service provider and preferably also from other service providers. The information is derived from the fingerprinting and FAAS processes.

The data sources processing modules also preferably receives data from external third-party data providers. These sources can include geolocation service 612 blacklist service 614, whitelist service 616, and so forth. A geolocation service 612 provides approximate geographic latitude and longitude corresponding to the user device IP address. Geolocation by IP address is a technique of determining the geographic latitude and longitude corresponding to a user by comparing the user's IP address with known locations of other nearby servers and routers. The geolocation service gives its subscribers another arrow in the quiver for battling Internet fraud. The third party blacklist service 614 typically provides a list containing IP addresses of suspected fraudulent users, e.g., addresses associated with suspected or known fraudulent activity. The third party whitelist service 616 typically provides a list of IP addresses that have a history of being legitimate, i.e., not associated with fraud.

FAAS processing is preferably performed by the rules engine 604. This rules engine can be constructed as known in the art to use a predetermined set of rules to determine authentication interface selection criteria. The data sources processing module is coupled to the rules engine in order to make external data readily form. The rules definition module 608 in order to provide stored rules and actions. Rules are stored in component 622 of the rules definition module; and actions associated with the rules are stored in storage 624. Rules can be supplied and stored by a service provider in order that authentication actions can be tailored to the service provider's requirements. The service provider service application 1322 can optionally also have a direct link to the rules engine so that so that the rules engine to request additional authentication guidance from the service provider application.

An exemplary action is to specify a particular authentication interface selection. For example, a rule may specify that where there is receipt of a request from a user device for a transfer of an amount of money over a certain threshold and where the device resides in a location, determined by geolocation information, known for an larger than normal volume of fraudulent activity, the action to be taken is to present a predetermined higher security user interface to the user in order to provide more security against a possible fraudulent transaction.

The rules engine evaluates its input data (and input guidance if any) according to the stored rules and determines interface selection criteria according to the stored actions. The interface selection criteria specify the type of authentication interface that should be displayed to the user at the current user device in order to authenticate the current access request. These criteria can, in some embodiments, specify the specific interface to be displayed, or can, in other embodiments, specify interface characteristics, such as level of security. The interface selection criteria are output to authenticator 700, which selects and displays the authentication interface to the user. The user then enters the requested authentication information and/or performs the requested authentication actions (if any). This entered information known as "user authentication information", is returned to the FAAS and/or to the service provider application. and the rules engine. Either the rules engine, or the service provider application, or both together evaluate the user authentication information to determine whether or nor the user is authenticated. Optionally, a degree of authentication can be determined. If the degree of authentication is insufficient, the service provider application may then request the FAAS to perform further authentications.

FIG. 5 illustrates an exemplary FAAS flowchart. FAAS processing is invoked when it receives device identification data, e.g., a Device ID, captured from user device by the fingerprinting process. Additional data can be retrieved from third-party providers. Identity and risk information is then evaluated 504 by the rules engine to determine whether or not a predetermined/preselected user interface is to be provided to the current device from which the user request originates. If so, authenticator function 700 is invoked 508 to generate the user interface, preferably a graphical interface, according to the interface selection criteria, and then to present 510 the interface to the device.

The rules engine then evaluates the returned user authentication information to further determine 512 whether or not other forms of authentication or verification are needed. Additional authentication, if needed, is performed 514 in accordance with the rules specified by the service provider. For example, optional step 514 can be where the service provider is a bank or other financial institution which seeks a higher security authentication interface for certain transactions.

Next, the rules engine and/or service provider system or application, based on the received authentication information, e.g., username and password, entered by the user, decide whether or not to authenticate the user as valid. If the user is valid, processing continues 520 with the service provider application 1322 at the service provider web server. If the user is not valid, the user is directed to an error message page 518. Typically, the service provider then blocks user access to the web server and terminates the session connection. Alternatively, the service provide may give the user additional opportunities to present valid user authentication information.

It should be appreciated that the service provider might not give the user an opportunity to use the user entry interface to input authentication information for validation. For example, if, based on the ID information, the user device is identified as posing a major risk of fraud, the system and method of the present invention enables the service provider to require via a rule that a fraud alert be sent to the service provider. The service provider may then respond by terminating the user's connection to the server before enabling entry of the user's authentication information via a user interface. The selection criteria for the initial user interface for display may be predetermined by the service provider.

It should also be appreciated that the user or service provider may request further authentication during the course of a valid already-authenticated session based on, e.g., the transaction being requested. For example, a bank or other financial institution may wish to invoke a higher security authentication interface during a session before transactions over a certain amount are sent to the server. The systems and methods of the present invention can be invoked to provide for such authentication.

User Interface Management

Figure 7:
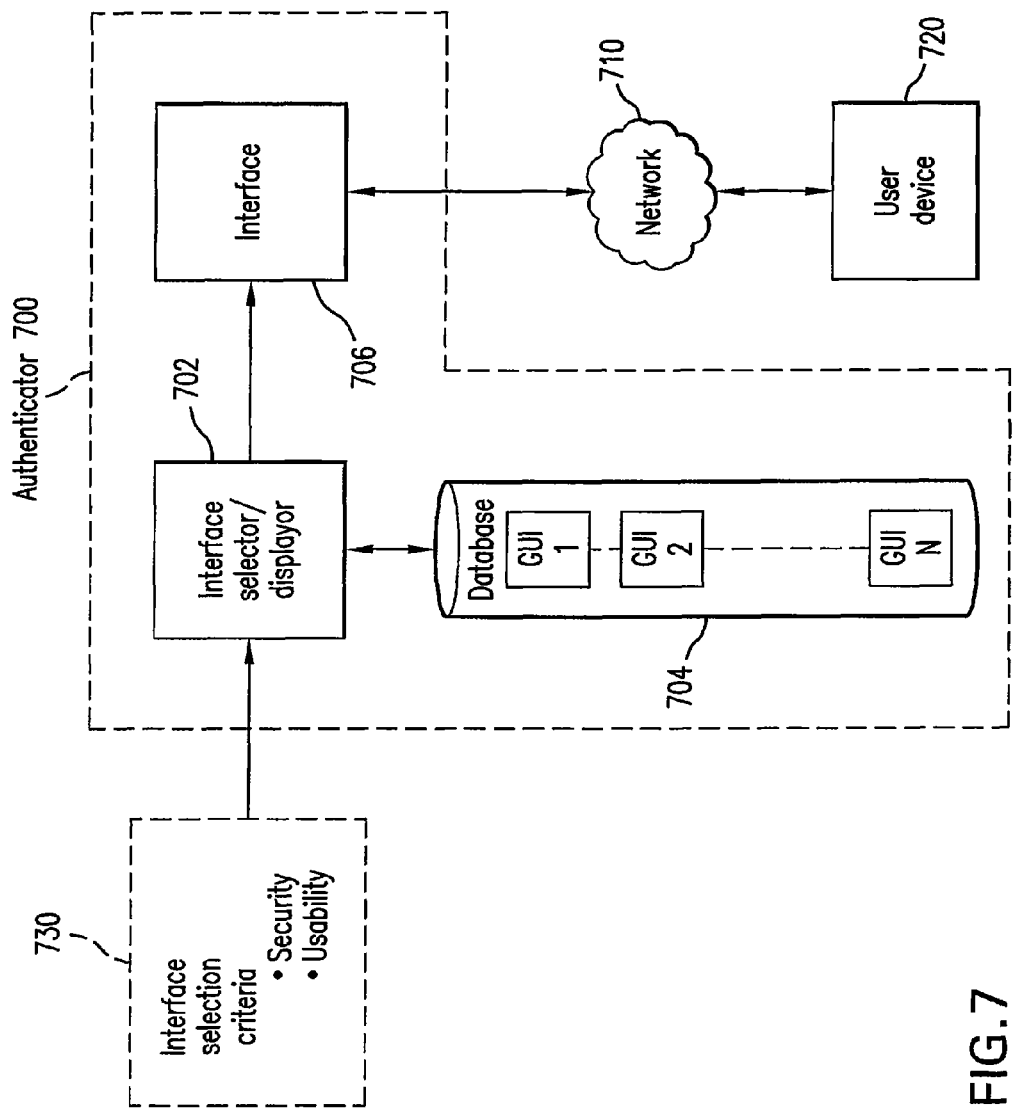
FIG. 7 illustrates a block diagram of an authenticator for enabling selection of one of a plurality of login graphical user interfaces as a function of a selection criteria, according to an embodiment of the present invention.

FIG. 7 is a block diagram of an authenticator 700. The authenticator presents a selected login interface to a user device 720 via the network 710 as a function of interface selection criteria 730 determined by the FAAS in dependence on input data and on rules. The selection criteria may include a plurality of usability and security factors. For example, the service provider or the user/subscriber to the service provider may request a heightened security login interface for certain types of transactions perceived to have heightened risk of fraud. This can be reflected in rules specific to the service provider, or to a particular user, or to a particular transaction type.

The present invention can address usability concerns by providing selectable multiple tiers of graphical login user interfaces, ranging from a basic familiar user interface to the most secure user interface, with a plurality of interfaces in between. For example, a more user-friendly interface can be presented for routine transactions to long-term user/customers who are using a device that does not present a known risk of fraud. In the latter case, a rule can be created for that user and included as part of the definitions module 608 in FIG. 6. Also, certain users may be permitted to add rules to tailor their authentication interfaces.

In more detail, interface selection criteria 730 are received by an interface setector/displayor 702 in authenticator 700. An interface module 706 and a database 704 are coupled to the interface selector/displayor 702. The database 704 comprises a plurality of graphical user interfaces (GUIs), shown as "GUI 1" to "GUI N". A selected one of the GUIs is sent to interface module 706 by the interface setector/displayor 702 as a function of the interface selection criteria 730. The interface module 706 sends the selected GUI to user device 720 via network 710. Optionally, the interface selection criteria can specify that the selected GUI be modified in a particular fashion. Entered user authentication information is returned to the FAAS and/or to the service provider.

Figure 1:
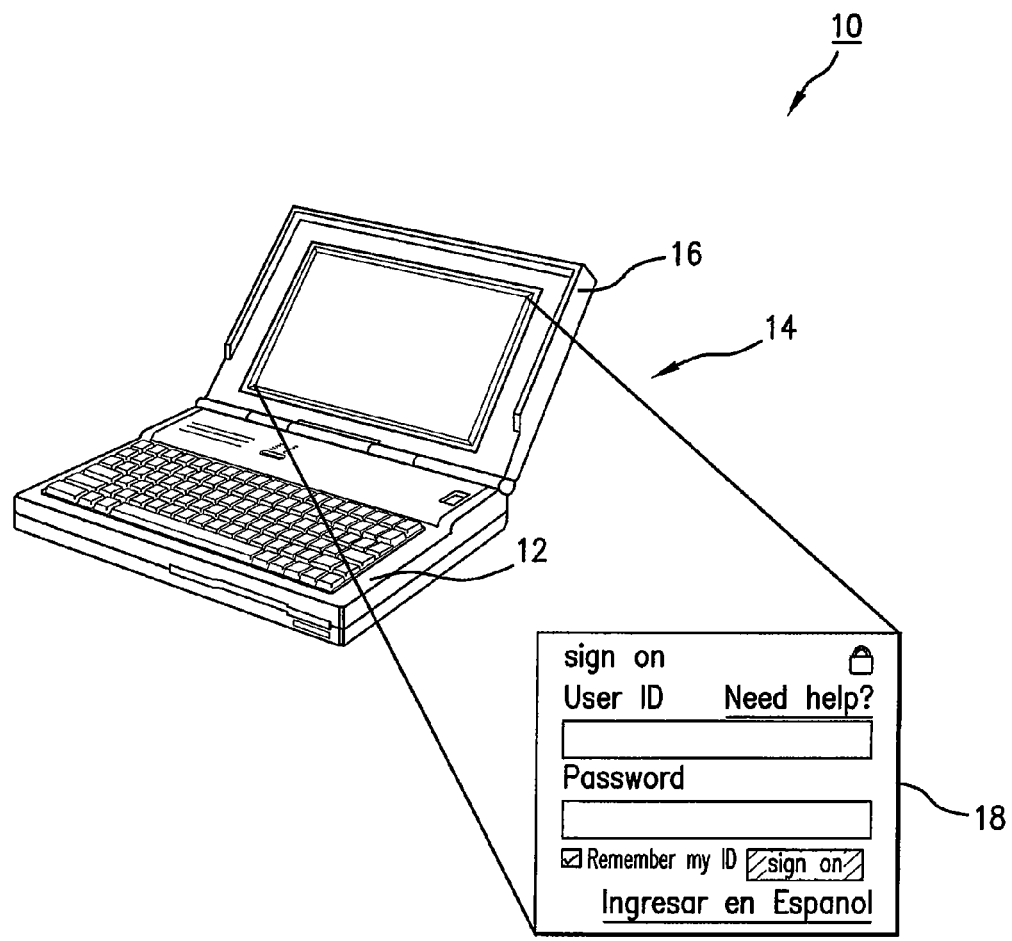
FIG. 1 is a diagram illustrating an exemplary prior art system used for entering user authentication.
Figure 2:
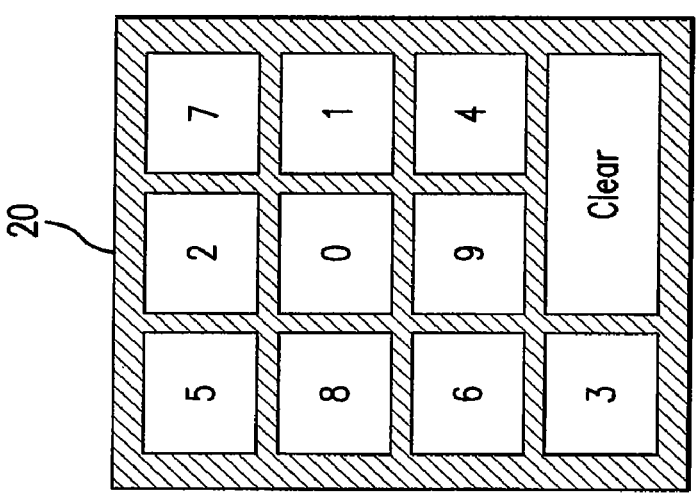
FIG. 2 illustrates a prior art keypad graphical user interface for enabling entry of authentication information via mouse click selections.

Database 704 can include user interfaces such as the interface 18 shown in FIG. 1 and the interfaces shown in FIGS. 2, 3, 8 and 9 and variations thereof, e.g., as shown in FIGS. 10A-E, that latter all illustrate a plurality of higher security interfaces based on the keypad user interface in FIG. 2. The user interfaces are shown with two authentication factors, userid or username and password, it should be appreciated that the present invention is not limited to two factors; additional factors may be included within the scope of the present invention. Each of the GUI's shown are sent to the user device using suitable software, e.g., MACROMEDIA Flash, Java, etc. In preferred embodiments, Flash software is used for the GUIs.

Figure 8:
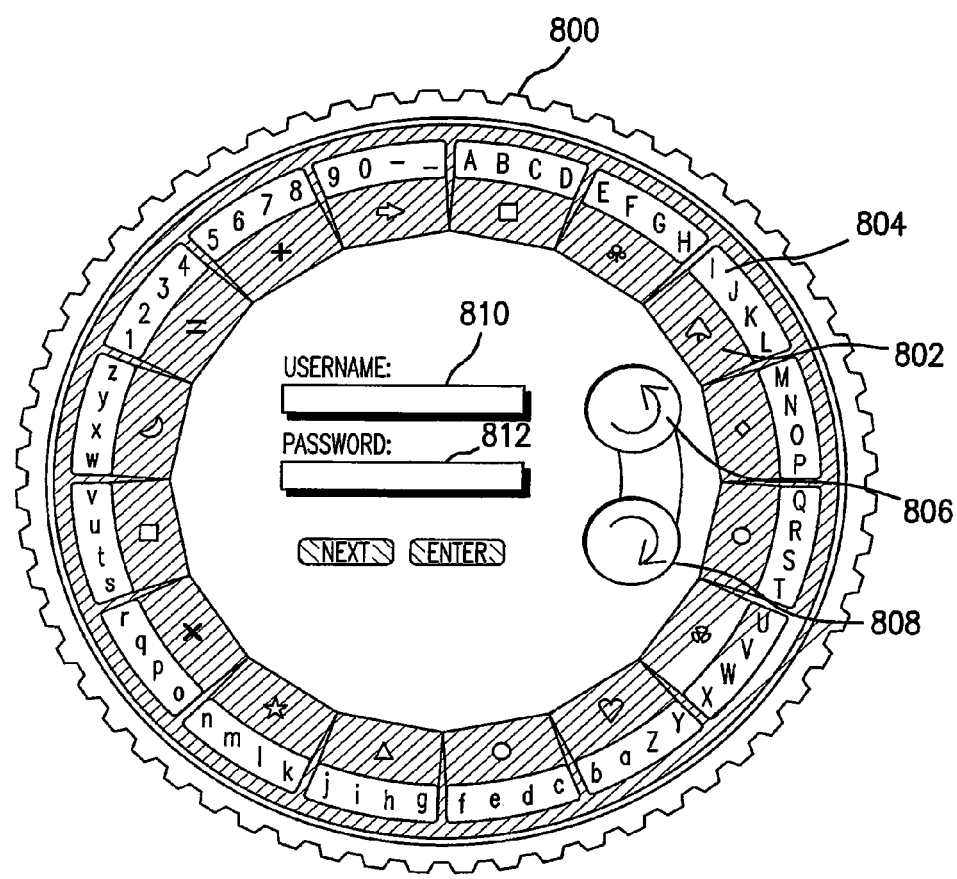
FIG. 8 illustrates a graphical wheel two-factor authentication interface for enabling authentication information entry using mouse click navigation for aligning alphanumeric and graphic symbols according to an embodiment of the present invention.
Figure 9:
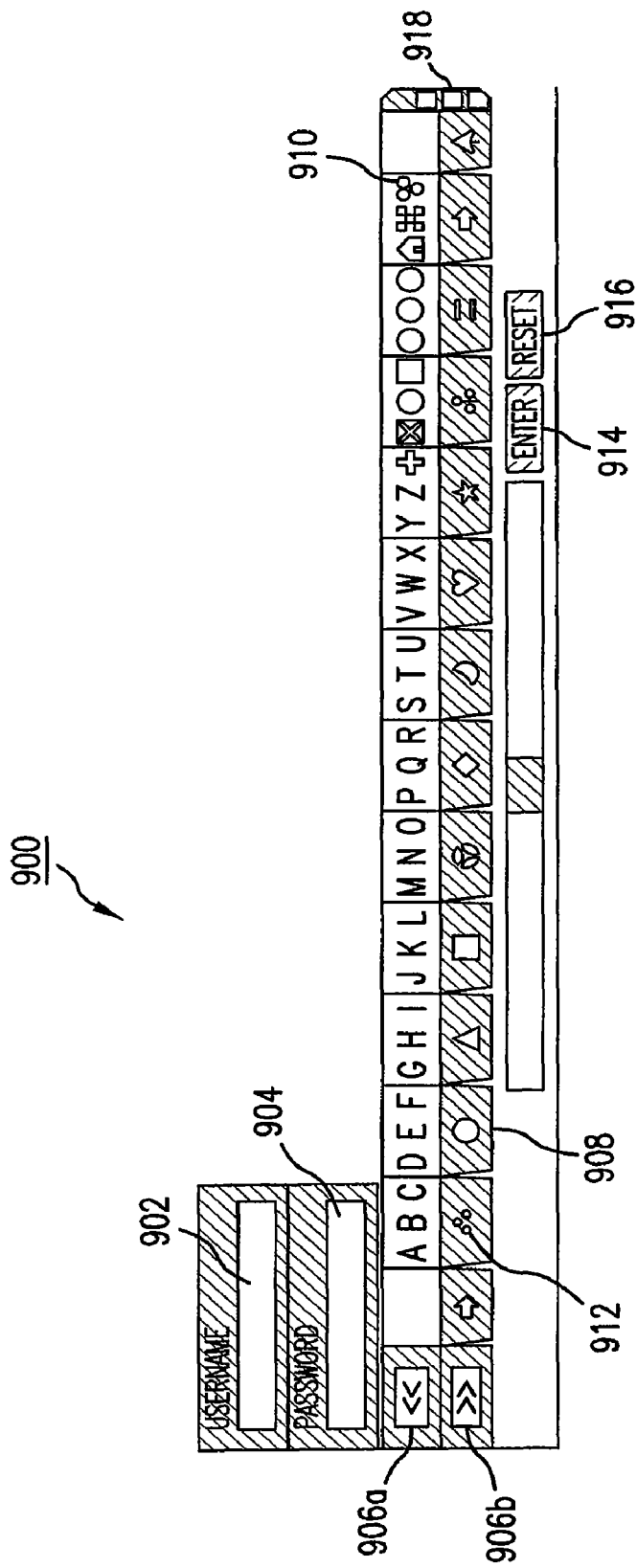
FIG. 9 illustrates an exemplary graphical slider authentication interface for enabling authentication information entry using mouse click navigation for aligning alphanumeric and graphic symbols according to an embodiment of the present invention.

The GUIs in FIGS. 8 and 9 provide heightened security by enabling users to enter and submit passwords or other sensitive information using an online image that is unrecognizable in actual image form as well as in data output form. Further details of the method providing the "unrecognizable" online image are found in pending U.S. patent application Ser. No. 11/169,564, which was filed Jun. 29, 2005 and which is incorporated by reference herein in its entirety. FIG. 8 illustrates a graphical wheel two-factor authentication interface for enabling authentication information entry using mouse click navigation for aligning alphanumeric and graphic symbols. FIG. 9 illustrates an exemplary graphical slider authentication interface for enabling authentication information entry using mouse click navigation for aligning alphanumeric and graphic symbols. It should be appreciated that the symbols and alphanumerics shown in FIGS. 8 and 9 are exemplary, i.e., other graphical symbols and images may be used to practice the invention.

The wheel GUI 800 in FIG. 8 can be generated or stored by the authenticator and comprises at least two concentric wheels 802 and 804 for encryption at the point of data entry. In order to enter to the next element (or symbol, or character) of the username field 810 or password field 812, a user guides reference points on the inner wheel 802 via navigational mouse clicks, on "right arrow" button 806 for counter-clockwise rotation and on "left arrow button" 808 for clockwise rotation, to the desired element on the outer wheel 804. Reference points are selected by and known only to the user, making the image un-interpretable and/or indiscernible to outsiders, including the various espionage software and "over-the-shoulder" spies.

Each time the user clicks on the "next" button to enter an image symbol, data describing the displacement though which the inner wheel 802 has moved from its prior orientation is sent to the server, preferably as degrees, or radians, or similar measure of angles. The "enter" button is preferably used to designate that the element for the username field 810 or password field 812 is to be entered. The button identifiers shown are exemplary only, other button identifiers may be used for the invention. Alternatively, only one button is preferably used instead of the "next" and "enter" buttons for systems wherein the username or password are of a fixed length. Preferably the entered elements are not displayed in either the username field 810 or password field 812 as an aid in preventing an "over the shoulder" spy from viewing the field information. For example, an asterisk may optionally be displayed in the field to signify entry of each element.

Displacement of the inner wheel 802 measured in degrees (or radians or similar measure of angles) is subsequently sent to, and decoded by the server. The authenticator knows the real authentication information and the image details and therefore deduces the selected marker by decoding the displacement information in order to determine/decode the user inputs for authenticating the session. Displacement coordinates are session-specific and unusable once the session ends.

FIG. 9 illustrates an exemplary graphical slider authentication interface 900 according to another embodiment of the present invention. The slider interface 900, also referred to as the ruler, includes a username entry field 902, password entry field 904, and selectable arrow buttons 906A and 906B for moving the slider. Alternatively keyboard arrow keys may also be used for moving the slider. The slider 900 includes a lower row 908 have a sequence of symbols (or characters), i.e., having the trump symbol 912, i.e., "♠", below the letter "B" for this example, and a fixed upper row 910 having a sequence of elements (characters) to be entered. The lower row 908 is slidingly displaceable in operation as a function of user navigational mouse clicks on the "left arrow" button 906A and "right mow button" 906B. Displacement of the moveable lower row 908 of the slider 900 is measured relative to the fixed upper sow 910 and sent to and decoded by the server once the user signifies entry using the "enter" button 914, Thus, the general concept of transmission of displacement information to the authenticator for the slider 900 is similar to that for the wheel 800.

A "reset" button 916 is preferably provided to enable a user to restart entry of the username or password. Block icons 918 are provided preferably on the right side of the two rows for displaying the status of the field entry, i.e., indicating how many elements of the user name or password have been entered. Preferably the entered elements are not displayed in either the username field 802 or password field 904 as an aid in preventing an "over the shoulder" spy from viewing the field information. Alternatively, an asterisk can be shown in the entry input portions to signify entry of each element.

FIG. 2 illustrates a graphical user interface in the from of a known numeric keypad. The keypad image is preferably one of the selectable GUIs in the database 704. FIGS. 10A-E illustrated higher security level user interface modifications to the standard keypad interface that provide five additional selectable tiers that are more secure than the standard keypad interface. These interfaces can be stored by the authenticator, or can be generated by the authenticator, e.g., from the interface of FIG. 2.

Figure 10A:
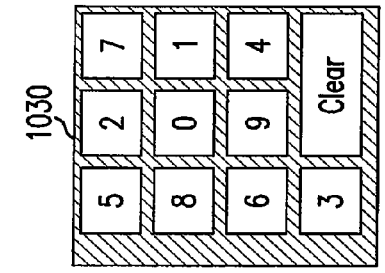
FIG. 10A illustrates a selectable higher security keypad graphical authentication interface for providing higher security including the reordering of the alphanumeric symbols in the interface in FIG. 2 according to an embodiment of the present invention.

FIG. 10A illustrates a first selectable higher security keypad graphical authentication interface that reorders the alphanumeric symbols in the interface in FIG. 2. Keypad 1010 contains an example of a reordered display of the numbers in the numeric keypad 20 in FIG. 2. The reordering provides additional security against mouse-click x-y coordinate loggers by having different x-y coordinates for the numbers on the keypad image.

Figure 10B:
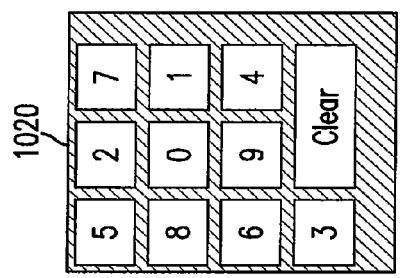
FIG. 10B illustrates a selectable higher security keypad graphical authentication interface for providing higher security including offsetting the keypad in the interface in FIG. 2 in one direction according to an embodiment of the present invention.

FIG. 10B illustrates a second selectable higher security keypad graphical authentication interface 1020 that offsets the keypad 20 of the interface in FIG. 2 in one direction. The keypad interface 1020 in FIG. 10B provides additional security against mouse click and x-y coordinate 23 loggers and screen capturers by offsetting the keypad. A drawback of the reordering in FIG. 10B is that a sophisticated screen capturer with optical character recognition (OCR) could decipher where, for instance, each number in the keypad is located in relative x-y coordinates and cross reference this to the x-y coordinates for the mouse clicks in order to ascertain the input numeric sequence.

Figure 10C:
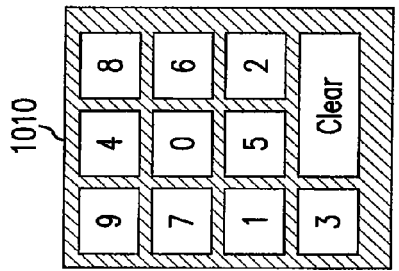
FIG. 10C illustrates a selectable higher security keypad graphical authentication interface for providing higher security including offsetting the keypad in the interface in FIG. 2 in another direction according to an embodiment of the present invention.

FIG. 10C illustrates a third selectable higher security keypad graphical authentication interface 1030 that offsets the keypad 20 of the interface in FIG. 2 in another direction.

Figure 10D:
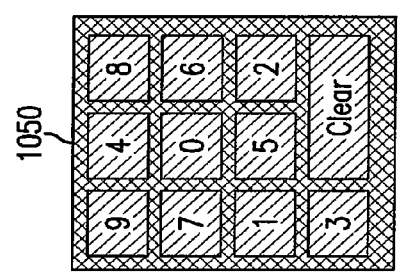
FIG. 10D illustrates a selectable security keypad graphical authentication interface for providing higher security including distortion of the alphanumeric keypad entry choices in the interface in FIG. 2 according to an embodiment of the present invention.

FIG. 10D illustrates a fourth selectable security keypad graphical authentication interface that distorts the alphanumeric keypad entry choices in the interface in FIG. 2. The method of distorting a graphic user interface image is described in further detail in pending U.S. patent application Ser. No. 11/169,564, which was filed Jun. 29, 2005 and is incorporated by reference herein in its entirety. The keypad 1040 provides additional protection against the screen capture/OCR and mouse click x-y loggers by distorting the image and the numeric characters. The distortion enables a human user to readily identity the number in the image, while preventing a screen capturer/OCR and x-y coordinate logger from linking mouse clicks to the specific number.

Figure 10E:
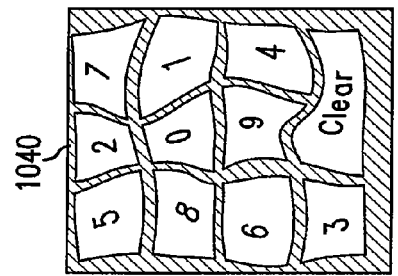
FIG. 10E illustrates a selectable higher security keypad graphical authentication interface for providing higher security including reordering along with shading of a portion of the interface in FIG. 2 according to an embodiment of the present invention.

FIG. 10E illustrates a fifth selectable higher security keypad graphical authentication interface 1050 that reorders and shades of a potion of the interface in FIG. 2. The speckled shading in the keypad interface 1050 provides protection against spyware that relies on checksums on the graphic image in order to decrypt the x-y location of each number on the numeric keypad in order to steal the username or password. The specked shading changes the resultant checksum as compared to the image in FIG. 10A and, coupled with the reordering of the keypad numbers as in FIG. 10B, provides enhanced security.

Figure 3:
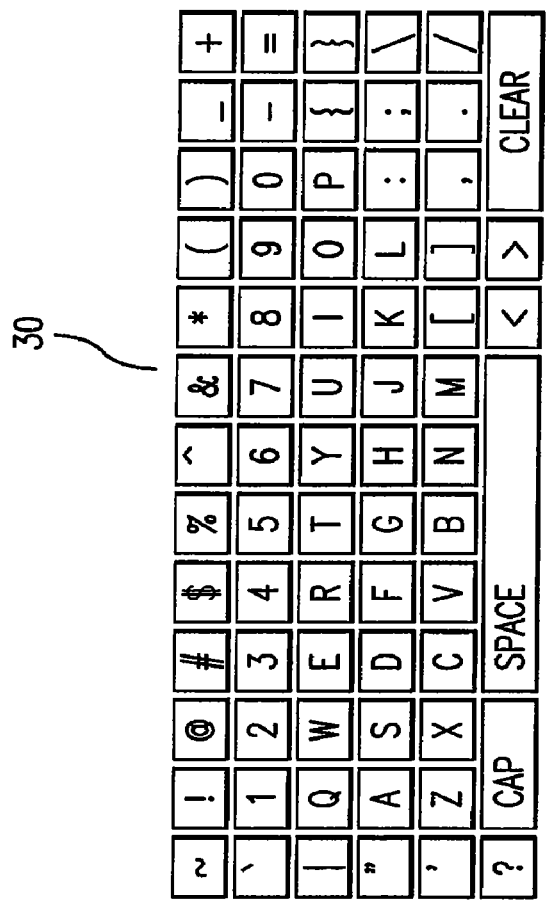
FIG. 3 illustrates a prior art keyboard graphical user interface for enabling entry of authentication information via mouse click selections.

It should be appreciated that the distortion methods of FIG. 10D, as well as the methods for the other modifications in FIGS. 10A-E, can also be applied to the other graphical user interfaces, e.g., distorting the keyboard, e.g., keyboard 30 of FIG. 3, as in the above-identified U.S. patent application. Conversely, this invention is not limited to the above-described distortion techniques, but includes other distortion techniques known in the art for enhancing security.

Device Central Repository Services

FIG. 11 is a block diagram illustrating an exemplary device central repository (DCR) system 1100 for storing and reporting historical device risk information to and from a plurality of service providers, e.g., service providers 1 through N. The DCR system includes a DCR server application which is resident and executed on a web server 1110 that is preferably separate from the web servers of the service providers. The DCR web server 1110 is made accessible to one or more service-provider subscribers, illustrated as service providers 1 to N on web servers 1120, 1122 to 1130, by suitable public networks or private networks such as the public Internet, and provides predetermined fraud risk information based on the device identifying information gathered by the fingerprinting module of this invention (when they are invoked by a service provider application). The service provider application communicates with the DCR server application by facilities provided by the flagged device module (FDM) 1200 executed at each service provider.

FIG. 12 is a block diagram illustrating an FDM embodiment. The flagged devices module 1200 includes a flagging rules engine 1210, a rule definitions module 1220, a shared lists processing module 1240, and a service provider authentication (valid/invalid) data module 1230. Turning first to the flagging rules engine, its inputs include information produced by the methods and systems of the current invention as well as information retrieved from external 3'rd party data providers. An important component of input information produced by this invention's system and methods includes service provider authentication information 1230. This information describes the authentication results of the current user access request, such as whether or not the current access request is valid and/or fraudulent.

Also input is device identifying information gathered from user devices 1260 by fingerprinting module 400. This identifying information is similar to identities information 500 input to FAAS 600 and stored in database 610. The identities information, therefore, preferably includes IP address, standard cookies, flash cookies, and other identifying information. The APPENDIX attached hereto describes methods of obtaining other identifying information for CPU type/processing speed and connection speed identifications. Other known identifiers may also be used to identify user devices, and may depend on the level of security and information that has been accessible in the past from the user device.

Also input is information from 3'rd party data providers 1250. This input is generally similar to the in content to the 3'rd party inputs to FAAS 600. These, as with the FAAS, include 3'rd party geolocation data 612, 3'rd party blacklist data 614, and 3'rd party whitelist data 616

The combined input information along with the current device identifying information is transmitted to the DCR where it is used to update the historical risk database. The combined input information is also evaluated by the flagging rules engine 1210 applies rules definitions 1220 in order to maintain lists that identify devices and their associated fraud risk based on historical information and optionally targeted to one or more specific user devices. Guided by the flagging rules engine, the shared lists processing 1240 creates, updates, and otherwise maintains a black-list 1242 and a white-list 1244. The lists are device based for identifying devices and the potential fraud risk posed by each device.

This information is made available to the FAAS (input 618 in FIG. 6). This information is also output to the DCR server 1110 in FIG. 11. The DCR can make then available the shared lists (and optionally further risk information) via the network to subscribing service providers and alternatively can be published so to make the listings available for use by 3'rd party vendors.

Although specific embodiments of the invention have been described, various modifications, alterations, alternative constructions, and equivalents are also encompassed within the scope of the invention. The specification and drawings are, accordingly, to be regarded in an illustrative rather than a restrictive sense. It will, however, be evident that additions, subtractions, deletions, and other modifications and changes may be made thereunto without departing from. the broader spirit and scope of the invention as set forth in the claims.

Administrative Tools

The present invention also include administrative tools that assist system operators and service providers in providing and monitoring authentication services.

Figure 17A:
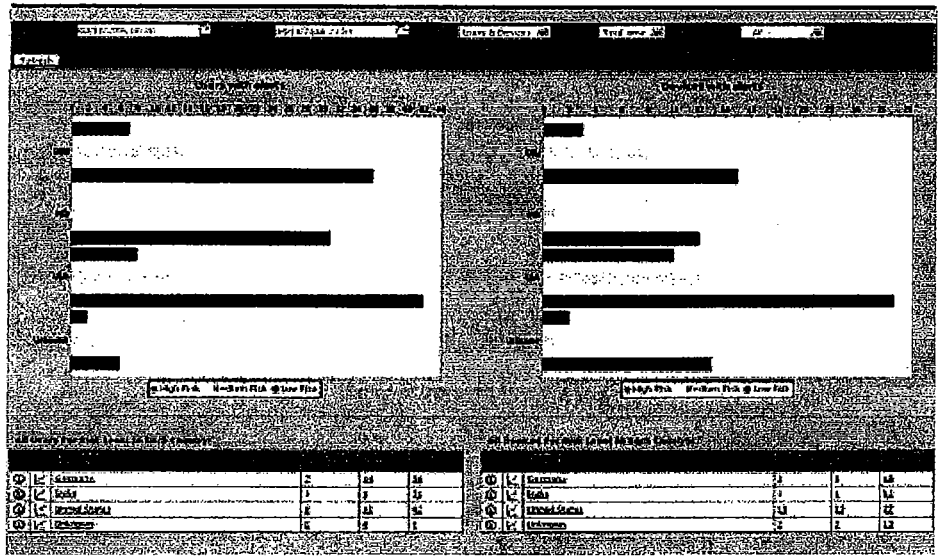
FIGS. 17A-D illustrate exemplary administrative tools.

FIG. 17A illustrates one such tools is known as a "dashboard". The dashboard has a graphical interface that allows customized views by users, devices, countries of origin, and provide an at-a-glance visibility into potential fraudulent activities in progress. The dashboard offers a real-time view of the health of the secured site. It contains a set of default monitors which can be combined in any fashion to track a specific set of activities. It can be tailored for each user to display only the monitors of interest. Monitors are the mechanisms used to aggregate real-time tracker information. Monitors can count everything from invalid users to login attempts from a specific country. a few of the default monitors include: attempted logins by status; new devices; first time logins; alert count; and location count (for a specific location or location group), After the monitors have been defined, they can be used in the dashboard view by specifying a monitor and a chart type.

The alerts browser gives a detailed list of alerts triggered at authentication and transaction check points. It identifies which user/transaction is at risk for fraudulent behavior by delivering correlated impact analysis organized by users, devices, geographies and alerts. The present invention can also automatically notify appropriate personnel or even the end user about the alerts/transactions via e-mail, pager, by forwarding alarms to a network management system, or by invoking any user-specified action.

Figure 17B:
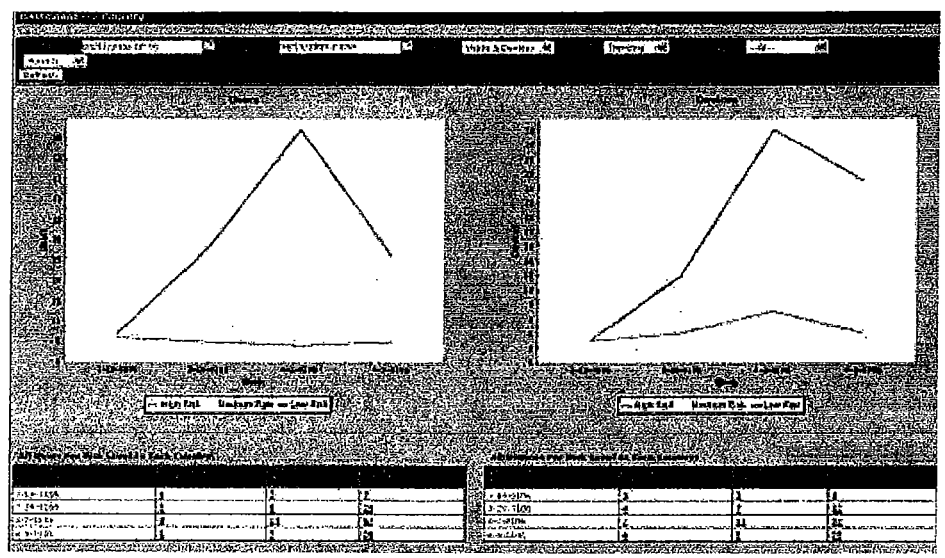

FIG. 17B illustrates that the dashboard can be customized to display only specific alerts for trending purposes, instead of all possible alerts. For example, the institution may want to only monitor all wire transfers with the red alert instead of all other transactions.

Figures 17C, 17D:
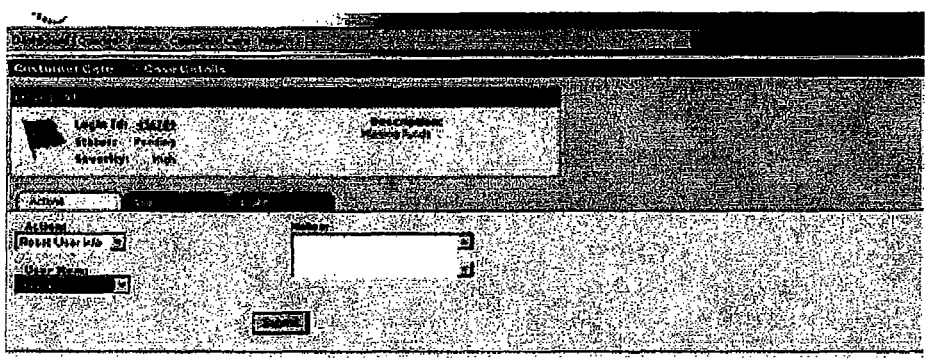

A further tool are customizable reports that provide detailed risk management and analysis information. Reports can provide historical information including geographic locations, devices, users. FIG. 17C illustrates an exemplary report. Most data accessed by the methods of the invention can be presented in one or more reports.

Another administrative tool provides case management that enables a service provider to review servicing logs for each individual client and to investigate the reasons actions were taken or alerts were triggered. FIG. 17D illustrates an exemplary screen of the customer care tool.

For example, service provider personnel can view the reason a login or transaction was blocked, view a severity flag with alert status to assist in escalation, complete actions such as issuing temporary allow for a customer, or un-registering a device, if appropriate, and the like. The capabilities and viewership rights in fraud analyzer component of the customer care can be customized and managed according to roles and company procedures.

APPENDIX A

Data Items Useful in Device Fingerprinting

| Use Cases | Symptoms |
| --- | --- |
| New Device Use Cases | |
| Both secure and flash cookies are enabled. | Both secure and flash cookies are missing. Flash request came through successfully. |
| Both secure and flash cookies are disabled. | |
| Secure cookies is enabled and flash is disabled | Both secure and flash cookies are missing. Also, the flash request didn't come through successfully. |
| Secure cookie is disabled and flash is enabled | Both secure and flash cookies are missing. But flash request came through successfully. |
| Regular Patterns | |
| Both secure and flash cookies are enabled. | Both secure and flash cookie came. |
| Both secure and flash cookies are disabled. | Both secure and flash cookies are missing. Also, the flash request didn't come through successfully. |
| Secure cookie is enabled and flash is disabled | Only secure cookie came through successfully. |
| Secure cookie is disabled and flash is enabled | Only flash cookie came through successfully. |
| Exceptions | |
| Browser upgrade. | Browser character mismatched |
| Device upgrade. | Flash data mismatched |
| Browser and Device upgrade. | Both browser and flash data mismatch |
| Used different browser. Secure cookie is missing. | Secure cookie is missing. Browser characteristics are mismatch. Flash cookie is matching. Flash data is a match (except browser). |
| User different browser. Both cookie and browser characteristics mismatch. | Secure cookie is mismatch. Browser characteristics are mismatch. Flash cookie is matching. Flash data is a match (except browser). |
| Secure cookie out of sync and flash is in sync. | Secure cookie is mismatch, but belonged to the same device. |
| Flash cookie out of sync and secure cookie is sync. | Flash cookie is a mismatch, but belonged to the same device. |
| Both secure cookie and flash are out of sync. | Both the cookies are mismatch, but they belonged to the same device |
| Other patterns | These use one of the combinations of regular and exception patterns. |
| User uses multiple browsers and flash enabled. | |
| User uses multiple browsers, with cookie disabled and flash enabled. | |
| Family using same device | |
| Family using same account | |
| Family using same device, same account, different browsers | |
| Family using same device, different account, different browsers | |
| User who travels a lot with their laptop | |
| User who travels a lot, uses kiosk | |

-continued

| Use Cases | Symptoms |
|---|---|
| User who travels, uses laptop or kiosk | |
| User who travels, but using wireless card always | |
| User who travels, but uses public wifi with their laptop | |
| Fraudulent Cases | |
| Stolen secure cookie and stolen flash cookie. With stolen browser characteristics and flash data. | |
| Stolen secure cookie and no flash request. With stolen browser characteristics. | |
| Stolen secure cookie and no flash request. Browser characteristic mismatches | |
| Cookie disabled and stolen flash cookie. With stolen browser characteristics and stolen flash data | |
| Cookie disabled and stolen flash cookie. With mismatch browser characteristics and stolen flash data | |
| Cookie disabled and stolen flash cookie. With mismatch browser characteristics and mismatch flash data | |
| Cookie disabled and flash request with no flash cookie. And stolen browser characteristics and stolen flash data. | |
| Secure cookie mismatches and belongs to another device | |

Rule Conditions Useful in Device and Location Fingerprinting

| | Description |
|---|---|
| Secure/Flash cookie characteristics | |
| Cookie Missing | Cookie was not received by the server |
| Cookie Mismatch | Cookie was received, but doesn't match the cookie stored in file. |
| Cookie Invalid | Cookie received is invalid |
| Cookie belongs to the same device | Cookie was mismatch with the cookie stored in the file, but belongs to the same device from a previous login |
| Cookie belongs to another device | Cookie was mismatch with the cookie stored in the file, and belongs to another device in the system. |
| Cookie missing for last n times for the same browser characteristics | The user logged in for the last n time with the same browser characteristics, but without cookies |
| Flash disabled | Flash request didn't come. |

-continued

| | Description |
|---|---|
| Browser characteristics | |
| Browser header match percentage | Overall match percentage |
| Known browser header attributes match percentage | Weighted match percentage of selected known attributes of the browser header |
| OS upgraded | Whether the OS was upgraded |
| Browser upgraded | Whether the browser was upgraded |
| Flash Data | |
| Flash data match percentage | Overall match percentage |
| Is flash upgraded | Is flash version has been upgraded |
| OS upgraded | Is OS upgraded? This is identified via flash call. |
| Location checks for the Device | |
| IP in device profile | Whether there was a prior successful login from this IP for this device. |
| IP subnet in device profile | Whether there was a prior successful login from this IP subnet for this device. |
| ISP in device profile | Whether there was a prior successful login from this ISP for this device. |
| ASN in device profile | Whether there was a prior successful login from this ASN for this device. |
| Geographical location in device profile | Whether there was a prior successful login from this geographical location for this device. |
| Time zone in device profile | Whether there was a prior successful login from this time zone for this device. |
| Location Identification rule conditions | |
| Geographical location confidence factor | Confidence factor returned by the location vendor for the given IP address |
| Distance between previous location | Distance between the two locations |
| Is login using annonymizer? | The user is using an annonymizer proxy to connect to the server |
| Is IP in IP list? | Checks whether the IP exists in the given IP list. The list could be imported from external database or from another source. |
| Is login from geographical location list? | Checks whether the location from where the user is logged in exists in the given location list. |
| Is ISP from ISP list? | Checks whether the ISP to which this IP belongs to is in the given ISP list. |
| Is IP in IP range? | Check whether the IP is in the given IP range |
| Location in user profile? | Whether there was a prior successful login from this location for this user |

APPENDIX B

CPU Detection

First method uses subtle differences between the listed CPUs to distinguish between them. The detection method is shown in brackets:

Intel i386SX (has POPAD bug)
Intel i386DX (without FPU)
Intel i486SX (has AC bit in flags register)

Intel i486DX (has ID bit in flags register, signs CPUID instruction support)
Intel Pentium (without FPU)
Cyrix Cx486S (Cyrix CPUs don't: change undefined flags after division)
Cyrix Cx486DX (without: FPU)
NexGen Nx586 (NexGen CPUs don't change zero-flag afier division)
NexGen Nx586FP The Second method uses the results of first method to ide-tifyth ese CPUs by the frequency:
AMD Am386SX (40 MHz)
AMD Am386DX (50 and 66 MHz)
Intel i486DX2 (100 and 120 MHz)
AMD Am484DX4 (66 and 80 MHz)
Cyrix Cx486DX2 (100 MHz)
Cyrix Cx486DX4 (all versions, 80 to 15 OMHz)
Cyrix 6x86 (all versions from 166 MNz)
Cyrix Ijx86MX (40 MHz)

The third method is performed only on those CPUs which support the CPUID instruction. That is, mainly all CPUs manufactured after the first Intel Pentium, introduced in 1983. Also new 486s from 1994 on support this instruction. However, motherboards with the Cyrix 5x86, Cyrix 6x86 and NexGen CPUs installed will usually have this instruction disabled in BIOS; for correct detection it needs to be enabled by software. This CPUID instruction returns enough information about CPU type to allow all new CPUs to be easily identified. The following CPUs are recognized by this method:
Intel i486DX
Intel i486SX
Intel i486DX2
Intel i486SL
Intel i486SX2
Intel i486DX4
Intel i486DX4 OverDrive
Intel Pentium
Intel Pentium OverDrive
Intel Pentium MMX
Intel Pentium MMX OverDrive
Intel Pentium Pro
Intel Pentium II OverDrive
Intel Penlium II
flltel Pentium II Xeon
Intel Pentium II PE (mobile)
Intel Celeron
Intel Celeron A (Slot 1)
Intel Celeron A (Socket 370)
Intel Pentiun III
Intel Pentium III Xeon
Intel Pentium III E
Intel Pentium III E Xeon
UMC U5S
UMC U5D
UMC U486SX2
UMC U486DX2
AMD Am486DX2
AMD Arn486DX4
AMD Am5x86
AMD KS
AMD K6
AMD K6-2
AMD K6-III
AMD Athlon
Cyrix Media GX
Cyrix Media GXm
Cyrix 5x86
Cyrix 6x86
Cyrix 6x86MX
Cyrix M-II
Centaur/IDT Winchip
Centaur/IDT WinChip 2
Centaur/IDT WinChip 2A
Centaur/IDT WinChip 213
Centaur/IDT WinChip 3
Rise mP6
NexGen Nx586
NexGen NxS86FP
NexGen Nx686

The CPUID instruction can be executed in several levels. First level of CPUID instruction returns a vendor specific string:
"GenuineIntel—returned by Intel processors.
"AuthenticAMD"—returned by AMD processors.
"CyrixInstead"—returned by Cyrix processors.
"NexGenDriven"—returned by NexGen processors.
"CentaurHauls"—returned by Centaur/IDT processors.
"RiseRiseRise"—returned by Rise processors.
"UMC UMC UMC"—returned by UMC processors.

Second level of the CPUID instruction returns information about type, family, model, stepping (revision) and other CPU features.

This application could contain a small database, which adds a short description to this detected information. Here's a brief explanation of the values returned by CPUID:
TYPE has these values:
0—means that TestCPU is using the primary (or only) CPU in the system
1—means an OverDrive processor is installed, i.e. an upgrade by direct replacement of a CPU on old motherboards
2—means a secondary (auxiliary) CPU in a multiprocessor system FAMILY is almost equivalent to generation and denotes CPU "performance" class:
4—all 486s, AMD 5x86, Cyrix 5x86
5—Intel Pentium and Pentium MMX, AMD K5 and K6, Cyrix 5x86, all Centaur/IDT Winchip, Rise mP6
6—Intel Pentium Pro, Celeron, Pentium II and Pentium III, AMD Athlon, Cyrix 6x86MX and M-I1

MODEL is a number which specifies a model in a family:
for example in family 4:
0—i486DX
3—i486DX2
8—i486DX4
for example in Emily 5:
2—Pentium
4—Pentium MMX
for example in family 6:
1—Pentium Pro
5—Pentium II
6—Celeron
7—Pentium III
NOTE: all these CPUs come from Intel. Other manufacturers' CPUs will not use this scheme.

STEPPING: this number is incremented according to small changes in CPU design.

BRAND: a new field from Intel to distinguish some of their CPUs. Known values are:
0—not supported
2—Intel Pentium IT1
3—Intel Pentium 111 Xeon—

Third level of CPUID instruction is supported only by Intel 6th generation CPUs (from Pentium Pro) and returns information about cache sizes as represented by these hexadecimal values:

$06—processor has 8 kB L1 cache fur instructions
$08—processor has 16kE3 L1 cache far instructions
$0A—processor has 8 kB L1 cache for data
$0C—processor has 16 kB L1 cache for data
$40—processor has no L2 cache (Celeron detection method)
$41—processor has 128 kB L2 cache (Celeron A)
$42—processor has 256 kB L2 cache (mobile Pentium II)
$43—processor has 512 kB L2 cache (Pentium II and ID)
$44—processor has 1 MB L2 cache (Xeon version)
$45—processor has 2 MB L2 cache (Xeon version)
$82—processor has 256 kB L2 cache (Pentium E)
$4x—means 4-way cache (all)
$8x—means 8-way cache (Pentium II E)

Fourth level of CPUID instruction is supported from Intel Pentium III up, and returns a processor serial number.

AMD, Cyrix and Centaur CPUs support some more levels of CPUTD, which can be used for detection of special features (for example 3Dnow! technology), their cache sizes or a string (a CPU name), which is coded on-chip. Strings returned by these CPUs are:

AMD-KS(tm) Processor
AMD-K6tm w/multimedia extensions
AMD-K6(tm) 3D processor
AMD-K6(tm)-2 Processor
AMD-K6(tm) 3D+Processor
AMD-K6j(tm)-III Processor
AMD-K7(tm) Processor
IDT WinChip 2
IDT WinChip 2-3D AMD K5
AMD K6
AMD K6-2
AMD K6-2
AMD K6-III
AMD K6-III
AMD K7
Centaur/IDT C2
Centaur/IDT C2

The CPU frequency is determined via two methods. First method measures the execution time of some CPU instructions, and compares this time to a table of values by CPU type. These values are the particular number of clock cycles needed by the identified CPU for that execution. Our application then divides the relevant value by the execution time, giving the CPU frequency.

A disadvantage of this method is that the frequency won't: be measured accurately if the correct CPU type wasn't detected, or if you have a new processor which is missing from the table!

Frequency Detection Via First Method:
Number of clock cycles needed for execution (from the table)/execution time=frequency 120000 'ticks'/0.0012 seconds=100 MHz Second method is applied only to CPUs with a Time Stamp Counter implemented. TSC counts processor clock cycles. It is incremented on each internal processor clock cycle and allows the mast accurate timing method on PCs. NB this counter is reset to zero after a processor reset. It is 64 bits wide, which is enough to count more than 5850 years, if a processor runs at 100 MHz. The CPUID instruction is used to check for an implemented TSC, All new CPUs will have TSC. Intel supports it from the Pentium processor upward, AMD from K5, and Cyrix from 6x86MX. The frequency can be theoretically measured to one clock cycle precision; actually the clock rate can alter slightly because of hardware factors. Even so, the system according to the present invention could measure frequency to a precision of 0.001 MHz.

Frequency detection via second method:
1) read TSC and write it into TI variable
2) wait exactly one second (while TSC is automatically incremented)
3) read TSC again, and write it into T2
4) frequency in Hertz is calculated from the difference T2−T1

P-Rating

Some CPUs have a suffix of PR beside frequency, meaning Performance Rating. This extra label comes from processor vendors AMD, Cyrix and IBM, who wish to suggest that their CPUs have better code execution and execute faster (at a given frequency) than Intel's Pentium or Pentium II processors. They use the Winstone benchmark for comparisons. So fur example a processor with Pentium 75 performance is labeled PR75.

Here's a PR table with clock speeds:

| Processor | internal/external clock speed in MHz |
| --- | --- |
| NexGen Nx586-PR75 | 70/35 |
| NexGen Nx586-PR80 | 75/37.5 |
| NexGen Nx586-PW0 | 84/42 |
| NexGen Nx586-PR100 | 93/46.5 |
| NexGea Nx586-PRl IO | 102/51 |
| NexGen Nx5 86-PR 120 | 111/55.5 |
| AMD Am5x86-PR75 | 133/33 |
| AMD K5-PR75 | 75/50 |
| AMD K5-PR90 | 90/60 |
| AMD KS-PRl 00 | 100/66 |
| AMD K5-PR120 | 90/60 |
| AMD KS-PR133 | 100/66 |
| AMD KS-PR166 | 116.7/66 |
| AMD K5-PR200 | 133/66 |
| Cyrix 5x86-PR75 | 100/33 |
| Cyrix 5x85-PR90 | 120/40 |
| Cyrix 6x86-PR90 | 80/40 |
| Cyrix 6x86-PR120 | 100/50 |
| Cyrix 4x86-PR133 | 110/55 |
| Cyrix 6x86-PRl 50 | 120/60 |
| Cyrix 4x86-PR166 | 133/66 |
| Cyrix 4x86-PR200 | 150/75 |
| Cyrix 6x 86MX-PR133 | 100/50, 110/55 |
| Cyrix 6x86MX-PR150 | 120/60, 125/50 |
| Cyrix 6x86MX-PRl66 | 133/66, 137.5/55, 150/50 |
| Cyrix 6x86MX-PR200 | 150/75, 165/55, 166/66 |
| Cyrix 6xX6MX-PR233 | 166/83, 187.5/75, 200/66 |
| Cyrix 6xX6MX-PW66 | 207.5/83, 225/75, 233/66 |
| Cyrix M-II: PR300 | 207.5/83, 225/75, 233/66 |
| Cyrix M-II PR333 | 250/83 |
| Cyrix M-11 PR366 | 250/100 |
| Cyrix M-H PR400 | 285/95 |
| Cyrix M-I1 PR433 | 300/100 |
| Rise mP6-PRl66 | 1 66/83 |
| Rise mP6-PR233 | 190/95 |
| Rise mP6-PI266 | 200/100 |
| Rise mP6-PR333 | 237.5/95 |
| Rise mP6-PR366 | 250/100 |
| DT WinChip2A-PR200 | 200/66 |
| DT WinChip2A-PR233 | 233/66 |
| IDT WinChip2A-PR300 | 250/100 |
| IDT WinChip3-PW33 | 200/66 |

Features

Processor features, which are returned with CPUID instruction is listed below. There are some interesting features for users:

Processor contains floating-point unit

This item signifies the presence of a floating-point unit (FPU) directly on-chip which all modern CPUs (from 486DX) will include. The FPU is used for real number calculations.

Time stamp counter TSC provides the most accurate timing method on a PC; it allows precise measurement of processor frequency.

Multiprocessor support (chip contains APIC) This signifies the presence of APIC, which permits symmetrical multiprocessing. If this item is crossed out then APIC is either disabled or not supported.

Processor serial number Means a serial number is enabled. This controversial feature can be disabled, (Then this item is crossed out) Software for this purpose is available from Intel.

MMX technology signifies a processor instruction set extension. 57 new MMX instructions accelerate graphics and multimedia processing. It was introduced with Intel's Pentium MMX processor. Currently MMX is supported by all processor manufacturers, Fast save and restore FP MMX/SSE signifies the ability of this processor to switch rapidly between FPU, MMX and SSE modes.

Intel Streaming SIMD Extensions (SSE) signifies the presence of a second instruction set extension—70 new instructions which speed up the processing of 3D graphics, sound and internet.

Supported from Intel's Pentiumn 111 processor upwards.

The next few features are supported only by Intel-competitive processors:

Partial SSE support signifies an instruction set extension of Athlon (and newer) processor. It supports the SSE-MMX and SSE-MEM instructions.

Cyrix extended MMX signifies an instruction set extension for 6x86MX2 M-I1 and newer processors. These processors support some new MMX instructions.

AMD 3Dnow! Signifies support for 23 instructions from AMD for 3D graphics speed up, which was first introduced with the KS-2 processor. This graphics instruction set is also supported by IDT WinChip processors. AMD extended 3Dnow! AMD Athion (and newer) processors have additional 3D instructions.

Memory

MOV test is first of two memory benchmarks, which measures transfer speed of memory and caches. These memory speeds are measured by transferring the same data block twice. During the first transfer, a data block is loaded into cache; the second time data is transferred from the cache. The block size is increased repeatedly from 2 kB to 2 MB. The transfer speed drops considerably above a certain block size, indicating that the cache has reached full capacity. Cache size can be detected in this way. One could use a pair of MOV instructions in this test—one of the most commonly used instructions. However transfers with a MOV instruction are slower than transfers via a MOVSD instruction, which is used in my second memory test.

Here's a part of an exemplary source code for use for this transfer:

@repeat: mov eax,[esi]
mov [edij ,eax
add esi,4
add edi,4
dec ecx
jnz @repeat

EST contains source address, ED1 holds target address and ECX contains the number of repetitions. To transfer 4 K, 1024 repetitions are needed, because 32 bits (4 bytes) are transferred at a time. Instruction MOV EAX,[ESI] reads data from source address [ESI] in memory into EAX register in the processor. Second instruction MOV [EDI],EAX writes data from EAX back to target address in memory in [EDI]. Next two instructions ADD ESI,4 and ADD EDX,4 increment pointers to source and target address to point at next 4 byte, which we will transfer. Next instruction DEC ECX decrements the ECX register by one, so that the loop will be repeated only 1023 times. The fast instruction JNZ @WPEAT forces repetition of this loop until ECX reaches zero.

Cache memory is fast and small. It holds Frequently used data which can be accessed quickly in the cache. Cache memory was used on 386 motherboards for the first time. From the 486 processor on, two caches are used. There is a first level cache (L1), which is on-chip, and a second level cache (L2), which is usually on the motherboard. This second level cache is bigger, but slower than the other. In Pentium—class processors the first level cache is divided into code and data cache.

Some on-die cache sizes:

| Processor: | L1 cache | L2 on-die cache: |
|---|---|---|
| Intel i486SX/DXDX2 | 8 kB | |
| Intel i4 86DX4 | 16 kB | 256 kb to 1 MB |
| Intel Pentium | 16 kB(8 kB + 8 kB) | 512 kB (Xeon to 2 MB) |
| Intel Pentium MMX | 32 kB(16 kB + 16 kB ) | |
| Intel Pentium Pro | 32 kB(16 kB + 16 kB ) | 128 kB |
| Intel Pentium II/III | 32 kB(16 kB + 16 kB ) | 256 kB |
| Intel Celeron | 32 kB(16 kB + 16 kB )) | |
| Intel Celeron A | 32 kB(16 kB + 16 kB ) | 256 kB |
| Intel Pentium III E | 32 kB(16 kB + 16 kB ) | 512 kB |
| AMD Am486DX/DX2/DX4 | 8 kB | |
| AMD Am5x86 | 16 kB | |
| AMD K5 | 24 kB (16 kB + 8 kB) | |
| AMD K6/K6-2 | 64 kB (32 kB + 32 kB) | |
| AMD K6-I11 | 64 kB (32 kB + 32 kB) | |
| AMD Athlon | 128 kB (64 kB + 64 kB) | |
| Cyrix Cx486SLC/DLC | 1 kB | |
| Cyrix Cx486S | 2 kB | |
| Cyrix Cx486DX/DX2/DX4 | 8 kB | |
| Cyrix 5x86/6xS6 | 16 kB | |
| Cyrix 6x86MX/M-II | 64 kB | |
| IDT WinChip/WinChip2 | 64 kB (32 kB + 32 kB) | |
| IDT WinChip3 | 128 kB (64 kB + 64 kB) | |

| Processor: | L1 cache | L2 on-die cache: |
|---|---|---|
| Rise mP6 | 16 kB (8 kB + 8 kB) | |
| NexGen Nx586 | 32 kB (16 kB + 16 kB) | |
| NexGen Nx686 | 48 kB (8 kB + 8 kB) | |
| UMC 486 | 8 kB | |
| IBM 486SLC | 16 kB | |

Memory 2

MOVSD test works similarly to the first memory bench. It too measures memory transfer speed, respectively cache transfer speed, but uses MOVSD instructions. This instruction is faster than a pair of MOV instructions, because a modem processor will pre-fetch reads using burst cycles and write-combine data into burst cycles. The method of transferring the data block is similar: ESI contains a source address, ED1 holds a target address and ECX counts the number of repetitions. Then a REP MOVSD instruction is executed. The REP prefix means that the following instruction will be executed repeatedly. Number of repetitions is determined in ECX register, whose value is decreased on every iteration, until the value is zero. Then execution of the REP MOVSD loop finishes. MOVSD instruction moves data from source address [ESI] to target address [EDI] and increases both pointers (ES1 and EDI) to point to the next location.

Calculations

Five mathematical benchmarks are listed below:

A first benchmark calculates a large factorial using integer numbers, so this benchmark only uses the processor (no FPU). The factorial of 10001 is the product of all numbers from 1 to 10001:

$$10001! = 1*2*3* \ldots 9998*9999*10000*10001$$

This factorial result is stored in 148 12 bytes (over 14 k3) of memory—a 11 8496-bit number! The result will still fit into an on-die L1 cache in most processors. It will not reflect main memory performance.

A second benchmark calculates the first 30000 prime numbers. This benchmark uses only integer numbers again, so it tests just the processor, and uses about 120 Id3 memory, which is accessed only once. Caching isn't needed.

A lot of intelligent algorithms exist to determine primes, we could use the following:

Number n is prime, if it isn't divisible by numbers bigger than 1 and smaller than n. But it will be enough to find divisibility by numbers (or factors) h m 2 to the square root of number a. All even numbers beyond two can't be primes, because by definition they are divisible by the number two.

A third benchmark calculates the determinant of a 9×9 matrix using Laplace transformation. This benchmark works with (regular) matrices of real numbers, so it will use both the processor and the FPU. A Laplace transformation is based on decomposition of an original matrix into smaller determinants, which are then decomposed etc, until a single number is obtained. In TestCPU this is done by recursive procedure calls. Here's a decomposition of a 3×3 matrix as an example of this benchmark in mathematical terms:

Detecting a User's Modem Speed

Unfortunately, there is no simple way to just call a function and find out the exact speed of a user's Internet connection. The only realistic way to do this is to download a large file from the internet, and then monitor the progress of the download. By measuring how long it takes to download the file based on the size of the download, you can calculate an estimate of the user's connection speed (this is exactly what most browsers' download functions do). More importantly, this calculation isn't just the theoretical connection speed (i.e. 56 Kbps or 1.5 Mbps), it's a real world test between the user's computer and your Internet hosting environment.

However, most users would be really annoyed if they had to sit through an unnecessary download just so you have an idea of what their connection speed is like. So the way around it is to incorporate this monitoring check into a loader movie that preloads an actual download of an authentication interface to be presented to the user. This way, we can get a sense of the user's connection speed without inconveniencing them.

When you click on each of the buttons, you will see the progress of the file being preloaded into your cache. As it preloads, it: also: calculates the approximate download speed you are getting on yaw individual machine. Now let's look at the sample code in Flash for this download.

```
on mouseUp me
    preloadFile ("http://www.bharosa.com/test/larg.png")
end
```

This code calls the preloadFile handler and passes it the exact URL to download. Now, you need to create the preloadFile handler in one of your movie scripts. Its code looks like this:

```
global gNetD, gStartTime
on prelaodFile whichFile
    gNetID = preloadNetThing(whichFile)
    sStartTime = 0
    timeout ("checkDownload").new(100, #checkDownload)
end
```

This preloadFile handler uses two global variables: gNetID and gStartTime. The first global, gNetID, keeps track of which network operation is currently preloading. The second global, gStartTime, keeps track of the time when the download started. This handler starts by assigning gNetID with the value of the net operation preloadNetThing. Next, it initializes gStartTime by setting it to zero. Finally, it creates a timeout object which wit1 call the handler checkDownload every f 00 milliseconds, or approximately ten times a second.

The network checker will execute the checkDownloadhandler 10 times a second. That handler looks like this:

```
on checkDownload
    tempStatus = getSmamStatus (gNetID)
    case tempStatus.state of
    "Complete":
        timeout ("checkDownload').forget 0
    "Started", "InProgress":
        if gStartTime = 0 then
            gStartTime = the ticks
        end if
    end case
```

-continued

```
        sendAllSprites (#updateDownloadInfo, tempStatus.bytesSoFar,
           tempStatus.bytesTotal, gStartTime)
     end
```

This handler starts by getting the streamStatus of the preload operation we called earlier. The getstreamStatus function in Network checker returns a property list in Checker that looks like this:

There are five different properties in this list. The #url property tells us the exact URL that is being downloaded, the #state property tells us what is currently happening with the download. There are five different possibilities for the state value: "Connecting", "Started", "InProgress", "Complete", and "Error". The #bytesSoFar property tells us the number of bytes that have been currently downloaded, and the #bytesTotal property tells us the total number of bytes in the download. Finally, if there is an error, it is returned in the #error property.

In the checkDownload handler, we assign this property list to a local variable name tempStatus. Next, we check the value of the #state property, if the operation has completed, then we forget the timeout object and everything is done. If the #state has just started or is in progress, then we check to see if the global variable gStartTicks is stilt set to 0.If it is, then we reset its value to the ticks, which is a system property that relates the current time in ⅟₆₀ths of a second. Finally, we use a sendAllSprites command to call the updateDownloadInfo handler in each of the different sprites on stage.

There are different behaviors on the progress bar and the text field containing the current time, and these behaviors use the information sent to it to update their awn content. The most important thing though, is that you use this information to calculate the average modem speed. That code looks like this:

```
on updateDownloadInfo me, bytesSoFar, bytesTotal, startTicks
   if startTicks <> 0 and bytesTotal <> 0 then
      tempTime = (the ticks − startTicks) / 60.0
      if tempTime <> 0 then
         modemRate = ((bytesSoFar *
         8.0) 1 1000.0) / tempTime
         sprite (me.spriteNum).member.text =
         string (modemRate) && "Kbps"
      end if
   end if
end
```

This handler starts by making sure that startTicks and bytesTotal are not equal to 0, which effectively makes sure that the download has actually started. Next, it subtracts the current ticks from startTicks and divides the number by 60 to give the exact number of seconds that have elapsed since the download began. If tempTime does not equal zero, then this handler calculates the modemRate by taking the bytes so far, multiplying it by 8, and then dividing it by 1000. It then divides that number by the total number of seconds that have elapsed since the download started and you are left with the actual download speed. Finally, take this number and display it in the text member an screen.

So this formula for modem speed is as follows. The number that is sent to the handler is the total number of bytes that have been downloaded. However, conventional modem speeds are represented by bits instead of bytes so we have to multiply the number of bytes by 8 to get the number of bits. Next, modem speeds are referred to in kilobits, or thousands of bits, so to find that number we take the total number of bits and divide them by 1000, Finally, we want to know the number of kilobits per second, so we take the total number of kilobits and divide it by the total number of seconds to get the number of kilobits per seconds.

So when the download is done and we are ready to move on to the actual authentication interface (Authenticator) movie, we have a text field all ready that contains a. fairly accurate description of the speed of a user's Internet connection.

What is claimed is:

1. A method comprising:
    receiving, at a server, an access request originating from a client device communicatively coupled with the server;
    gathering, by the server, identifying information concerning the client device;
    retrieving, by the server, risk information from a device central repository (DCR), the risk information identifying a risk that the access request is fraudulent;
    determining, by the server, authentication interface selection criteria based on the identifying information and the risk information;
    selecting, by the server, a graphical authentication user interface from a plurality of graphical authentication user interfaces based on the authentication interface selection criteria,
    wherein each of the plurality of graphical authentication user interfaces is a variation of a single user interface and includes one or more distinct graphical elements for entering authentication information,
    the distinct graphical elements are variations of corresponding elements of the single user interface, and
    the selected graphical authentication user interface has a level of security commensurate to the risk identified in the risk information;
    causing, by the server, the graphical authentication user interface to be presented at the client device;
    determining, by the server, whether to authenticate the access request based on information entered at the client device in response to the presented graphical authentication user interface; and
    updating, by the server, the risk information stored in the DCR based on authentication results for the access request.

2. The method of claim 1 wherein the access request is a request to logon to the server or a request to perform a financial transaction, and wherein the identifying information uniquely identifies the client device.

3. The method of claim 1 wherein the identifying information comprises persistent data stored on the client device.

4. The method of claim 3 further comprising:
    assembling a Device ID data item based on at least part of the identifying information; and
    causing the Device ID data item to be stored on the client device as persistent data.

5. The method of claim 3 wherein the persistent data comprises a cookie or information that is secured against alteration.

6. The method of claim 1 wherein the identifying information comprises information related to characteristics of the client device or characteristics of a network connection of the client device.

7. The method of claim 6 where the characteristics of the client device comprise at least one of a communication adapter MAC address, a local time, a local time zone, a microprocessor type, a microprocessor processing characteristic, a microprocessor serial number network address, a network connection speed, a network rate for data upload to the server, or a network rate for data download from the server.

8. The method of claim 1 wherein determining the authentication interface selection criteria is further based on contents of the request.

9. The method of claim 1 wherein determining the authentication interface selection criteria is further based on data from one or more third-party data providers.

10. The method of claim 9 wherein the third-party data providers comprises a device geolocation data provider, a device blacklist data provider, and a device whitelist data provider.

11. The method of claim 1 wherein determining the authentication interface selection criteria comprises applying rules encoding requirements for authenticating access requests at the server.

12. The method of claim 1 wherein updating the risk information stored in the DCR is further based on data received from a device geolocation data provider, a device blacklist data provider, or a device whitelist data provider.

13. The method of claim 1 wherein the one or more distinct graphical elements include a keypad, slider, or wheel.

14. The method of claim 1 wherein the plurality of graphical authentication user interfaces are predefined and stored in a graphical user interface database.

15. A system comprising:
a processing component configured to:
receive an access request originating from a client device;
gather identifying information concerning the client device;
retrieve risk information from a device central repository (DCR), the risk information identifying a risk that the access request is fraudulent;
determine authentication interface selection criteria based on the identifying information and the risk information;
select a graphical authentication user interface from a plurality of graphical authentication user interfaces based on the authentication interface selection criteria,
wherein each of the plurality of graphical authentication user interfaces is a variation of a single user interface and includes one or more distinct graphical elements for entering authentication information,
the distinct graphical elements are variations of corresponding elements of the single user interface, and
the selected graphical authentication user interface has a level of security commensurate to the risk identified in the risk information;
cause the graphical authentication user interface to be presented at the client device;
determine whether to authenticate the access request based on information entered at the client device in response to the presented graphical authentication user interface; and
update the risk information stored in the DCR based on authentication results for the access request.

16. The system of claim 15 wherein the client device is a personal computer.

17. The system of claim 15 wherein the client device is a user terminal.

18. The system of claim 15 wherein the plurality of graphical authentication user interfaces are stored in an interface database.

19. The system of claim 15 wherein determining the authentication interface selection criteria comprises applying a set of rules, the set of rules encoding requirements for authenticating access requests at the server.

20. The system of claim 19 wherein applying the set of rules comprises:
evaluating a risk that the access request is fraudulent, the evaluating being based at least in part on the identifying information; and
determining the authentication interface selection criteria based at least in part on the evaluated risk.

21. The system of claim 19 further comprising a rules definition database for storing the set of rules.

22. The system of claim 15 wherein the one or more distinct graphical elements include a keypad, slider, or wheel.

23. The system of claim 15 wherein the plurality of graphical authentication user interfaces are predefined and stored in a graphical user interface database.

24. A non-transitory computer-readable storage medium having stored thereon program code executable by a computer system, the program code comprising:
code that causes the computer system to receive an access request originating from a client device communicatively coupled with the computer system;
code that causes the computer system to identify information concerning the client device;
code that causes the computer system to retrieve risk information from a device central repository (DCR), the risk information identifying a risk that the access request is fraudulent;
code that causes the computer system to determine authentication interface selection criteria based on the identifying information and the risk information;
code that causes the computer system to select a graphical authentication user interface from a plurality of graphical authentication user interfaces based on the authentication interface selection criteria,
wherein each of the plurality of graphical authentication user interfaces is a variation of a single user interface and includes one or more distinct graphical elements for entering authentication information,
the distinct graphical elements are variations of corresponding elements of the single user interface, and
the selected graphical authentication user interface has a level of security commensurate to the risk identified in the risk information;
code that causes the computer system to send the graphical authentication user interface to the client device, wherein the graphical authentication user interface is presented at the client device;
code that causes the computer system to determine whether to authenticate the access request based on information entered at the client device in response to the presented graphical authentication user interface; and
code that causes the computer system to update the risk information stored in the DCR based on authentication results for the access request.

25. The non-transitory computer-readable storage medium of claim 24 wherein the one or more distinct graphical elements include a keypad, slider, or wheel.

26. The non-transitory computer-readable storage medium of claim 24 wherein the plurality of graphical authentication user interfaces are predefined and stored in a graphical user interface database.

* * * * *

UNITED STATES PATENT AND TRADEMARK OFFICE
CERTIFICATE OF CORRECTION

PATENT NO.        : 7,908,645 B2                                Page 1 of 4
APPLICATION NO.   : 11/412997
DATED             : March 15, 2011
INVENTOR(S)       : Varghese et al.

It is certified that error appears in the above-identified patent and that said Letters Patent is hereby corrected as shown below:

On sheet 5 of 21, in figure 5, Reference Numeral 514, line 3, delete "authenthication/" and insert -- authentication/ --, therefor.

On sheet 13 of 21, in figure 13A, Reference Numeral 1306, delete "Authencation" and insert -- Authentication --, therefor.

On sheet 15 of 21, in figure 14, line 1, delete "Authencation" and insert -- Authentication --, therefor.

On sheet 15 of 21, in figure 14, line 3, delete "ect.)" and insert -- etc.) --, therefor.

On sheet 15 of 21, in figure 14, line 17, delete "Trencing" and insert -- Trending --, therefor.

On sheet 17 of 21, in figure 15B, line 3, delete "specifed" and insert -- specified --, therefor.

In column 4, line 40, delete "an" and insert -- on --, therefor.

In column 6, line 30, delete "to then" and insert -- then to --, therefor.

In column 6, line 58, delete "care" and insert -- care. --, therefor.

In column 10, line 60, delete "fingerprinting" and insert -- fingerprinting. --, therefor.

In column 11, line 55, delete "on" and insert -- or --, therefor.

In column 17, line 32, delete "countries," and insert -- countries. --, therefor.

In column 18, line 36, above "TABLE 7" insert -- Table 7 present a further example of data items relevant to security policies. --.

Signed and Sealed this
Fourth Day of October, 2011

David J. Kappos
*Director of the United States Patent and Trademark Office*

In column 20, line 13, after "9" insert -- is --.

In column 20, line 20, below "Secure Cookie Mismatch" insert -- KEY     T = True     F = False    X = Missing --.

In column 20, line 43, delete "Inernet" and insert -- Internet --, therefor.

In column 20, line 56, delete "Accordinly," and insert -- Accordingly, --, therefor.

In column 28, line 14, delete "nor" and insert -- not --, therefor.

In column 29, line 30, delete "setector" and insert -- selector --, therefor.

In column 29, line 35, delete "setector" and insert -- selector --, therefor.

In column 31, line 6, delete "from" and insert -- form --, therefor.

In column 31, line 48, delete "identity" and insert -- identify --, therefor.

In column 32, line 52, delete "616" and insert -- 616. --, therefor.

In column 32, line 67, delete "then" and insert -- them --, therefor.

In column 36, line 39, delete "annonymizer?" and insert -- anonymizer? --, therefor.

In column 36, line 39, delete "annonymizer" and insert -- anonymizer --, therefor.

In column 37, line 8, delete "afier" and insert -- after --, therefor.

In column 37, line 11, delete "ide-tifyth ese" and insert -- identify these --, therefor.

In column 37, line 17, delete "15 OMHz)" and insert -- 150 MHz) --, therefor.

In column 37, line 18, delete "MNz)" and insert -- MHz) --, therefor.

In column 37, line 44, delete "Penlium" and insert -- Pentium --, therefor.

In column 37, line 45, delete "flltel" and insert -- Intel --, therefor.

In column 37, line 50, delete "Pentiun" and insert -- Pentium --, therefor.

In column 37, line 59, delete "Arn" and insert -- Am --, therefor.

In column 38, line 45, delete "M-I1" and insert -- M-II--, therefor.
In column 39, line 18, delete "II" and insert -- III --, therefor.

CERTIFICATE OF CORRECTION (continued)

In column 39, line 22, delete "CPUTD," and insert -- CPUID, --, therefor.

In column 39, line 27, delete "K6tm" and insert -- K6(tm) --, therefor.

In column 39, line 29, delete "K6(tm)" and insert -- K6f(tm) --, therefor.

In column 40, line 32, delete "PRl IO" and insert -- PR100 --, therefor.

In column 40, line 35, delete "PRl 00" and insert -- PR100 --, therefor.

In column 40, line 38, delete "PRl66" and insert -- PR166 --, therefor.

In column 40, line 44, delete "PRI 50" and insert -- PR150 --, therefor.

In column 40, line 48, delete "PRl66" and insert -- PR166 --, therefor.

In column 40, line 51, delete "M-Il" and insert -- M-II: --, therefor.

In column 40, line 52, delete "M-Il" and insert -- M-II: --, therefor.

In column 40, line 53, delete "M-H" and insert -- M-II: --, therefor.

In column 40, line 54, delete "M-I1" and insert -- M-II: --, therefor.

In column 40, line 55, delete "PRl66" and insert -- PR166 --, therefor.

In column 41, line 21, delete "manufacturers," and insert -- manufacturers. --, therefor.

In column 41, line 22, delete "FP MMX" and insert -- FP/MMX --, therefor.

In column 41, line 29, Below "internet." delete "Supported from Intel's Pentiumn 111 processor upwards." And insert -- Supported from Intel's Pentium 111 processor upwards. --, on Col. 41, Line 28, after "internet." as a continuation of the same paragraph.

In column 41, line 37, delete "M-I1" and insert -- M-II: --, therefor.

In column 41, line 43, delete "Athion" and insert -- Athlon --, therefor.

In column 42, line 17, delete "[edij ," and insert -- [edi], --, therefor.

In column 41-42, line 59, delete "K6-I11" and insert -- K6-III --, therefor.

In column 43, line 27, delete "(ES1" and insert -- (ESI --, therefor.

In column 44, line 52, delete "wit1" and insert -- will --, therefor.

In column 44, line 53, delete "f 00" and insert -- 100 --, therefor.

In column 45, line 26, delete "0.If" and insert -- 0. If --, therefor.

In column 45, line 39, delete "DownIoad" and insert -- Download --, therefor.